United States Patent
Ohara

(10) Patent No.: US 11,405,960 B2
(45) Date of Patent: Aug. 2, 2022

(54) USER EQUIPMENT AND BASE STATION

(71) Applicant: NTT DOCOMO, INC., Tokyo (JP)

(72) Inventor: Tomoya Ohara, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 118 days.

(21) Appl. No.: 16/767,402

(22) PCT Filed: Nov. 28, 2018

(86) PCT No.: PCT/JP2018/043872
§ 371 (c)(1),
(2) Date: May 27, 2020

(87) PCT Pub. No.: WO2019/107453
PCT Pub. Date: Jun. 6, 2019

(65) Prior Publication Data
US 2020/0396770 A1 Dec. 17, 2020

(30) Foreign Application Priority Data

Dec. 1, 2017 (JP) .............................. JP2017-231720

(51) Int. Cl.
*H04W 74/08* (2009.01)
*H04W 56/00* (2009.01)
*H04W 72/04* (2009.01)

(52) U.S. Cl.
CPC ..... *H04W 74/0833* (2013.01); *H04W 56/001* (2013.01); *H04W 72/04* (2013.01)

(58) Field of Classification Search
CPC ............... H04W 72/04; H04W 56/001; H04W 74/0833
See application file for complete search history.

(56) References Cited

U.S. PATENT DOCUMENTS

2019/0174550 A1* 6/2019 Huang ................ H04W 72/12
2020/0187268 A1* 6/2020 Huang ................ H04W 72/12
(Continued)

OTHER PUBLICATIONS

3GPP TS 36.213 V14.4.0 "3rd Generation Partnership Project; Technical Specification Group Radio Access Network Evolved Universal Terrestrial Radio Access (E-UTRA); Physical layer procedures (Release 14)" Sep. 2017 (462 pages).
(Continued)

*Primary Examiner* — Brian D Nguyen
(74) *Attorney, Agent, or Firm* — Osha Bergman Watanabe & Burton LLP

(57) ABSTRACT

User equipment for communicating with a base station via a radio frame includes a receiver to receive, from the base station, information indicating a downlink region or an uplink region, and information on a RACH configuration table indicating allocation of RACH resources associated with a time domain; a control unit to identify an available RACH resource, based on the information indicating a downlink region or an uplink region, and the information on the RACH configuration table; and a transmitter to transmit a preamble to the base station using the identified available RACH resource. The information indicating the downlink region or the uplink region includes an unknown region used for one of downlink and uplink, and availability of the RACH resource in the unknown region is explicitly or implicitly identified in case where the information on the RACH configuration table indicates that the RACH resource is allocated to the unknown region.

11 Claims, 14 Drawing Sheets

(56) References Cited

U.S. PATENT DOCUMENTS

| | | | | |
|---|---|---|---|---|
| 2020/0214046 | A1* | 7/2020 | Wang | H04W 74/08 |
| 2021/0289457 | A1* | 9/2021 | Tavildar | H04W 76/10 |
| 2021/0321422 | A1* | 10/2021 | Yi | H04L 5/0092 |
| 2021/0337438 | A1* | 10/2021 | Xiong | H04W 36/0077 |
| 2021/0352734 | A1* | 11/2021 | Svedman | H04W 72/1263 |
| 2021/0368545 | A1* | 11/2021 | Xu | H04W 72/0406 |
| 2021/0368551 | A1* | 11/2021 | Xiong | H04W 72/042 |

OTHER PUBLICATIONS

3GPP TS 36.211 V14.4.0 "3rd Generation Partnership Project; Technical Specification Group Radio Access Network Evolved Universal Terrestrial Radio Access (E-UTRA); Physical channels and modulation (Release 14)" Sep. 2017 (197 pages).

3GPP TSG RAN WG1 Meeting 91; R1-1719617 "Remaining details on RA procedure" Fujitsu; Reno, USA; Nov. 27-Dec. 1, 2017 (7 pages).

3GPP TSG RAN WG1 #91; R1-1720922 "Remaining details on random access procedure" Motorola Mobility, Lenovo; Reno, USA; Nov. 27-Dec. 1, 2017 (7 pages).

3GPP TSG RAN WG1 Meeting #91; R1-1721471 "Summary of Remaining details on PRACH formats" Convida Wireless; Reno, USA; Nov. 27-Dec. 1, 2017 (30 pages).

3GPP TSG RAN WG1 Meeting #91; R1-1721044 "Remaining details on PRACH formats " NTT DOCOMO, Inc.; Reno, USA; Nov. 27-Dec. 1, 2017 (22 pages).

International Search Report issued in International Application No. PCT/JP2017/043872, dated Jan. 29, 2019 (4 pages).

Written Opinion issued in International Application No. PCT/JP2018/043872; dated Jan. 29, 2019 (4 pages).

Extended European Search Report issued in counterpart European Application No. 18884697.6 dated Aug. 3, 2021 (9 pages).

NTT DOCOMO, Inc.; "Remaining details on PRACH formats" 3GPP TSG RAN WG1 Meeting #91, R1-1720794; Reno, USA, Nov. 27-Dec. 1, 2017 (14 pages).

Office Action issued in Indian Application No. 202037027672 dated Nov. 10, 2012 (8 pages).

LG Electronics, "Discussion on PRACH preamble format details" 3GPP TSG RAN WG1 Meeting #91, R1-1719897, Reno, USA, Nov. 27-Dec. 1, 2017 (10 pages).

Office Action issued in the counterpart Japanese Patent Application No. 2019-557293, dated Mar. 22, 2022 (5 pages).

Intel Corporation; "Group-common PDCCH: Contents"; 3GPP TSG RAN WG1 Meeting #90, R1-1712573; Prague, Czechia, Aug. 21-25, 2017 (6 pages).

* cited by examiner

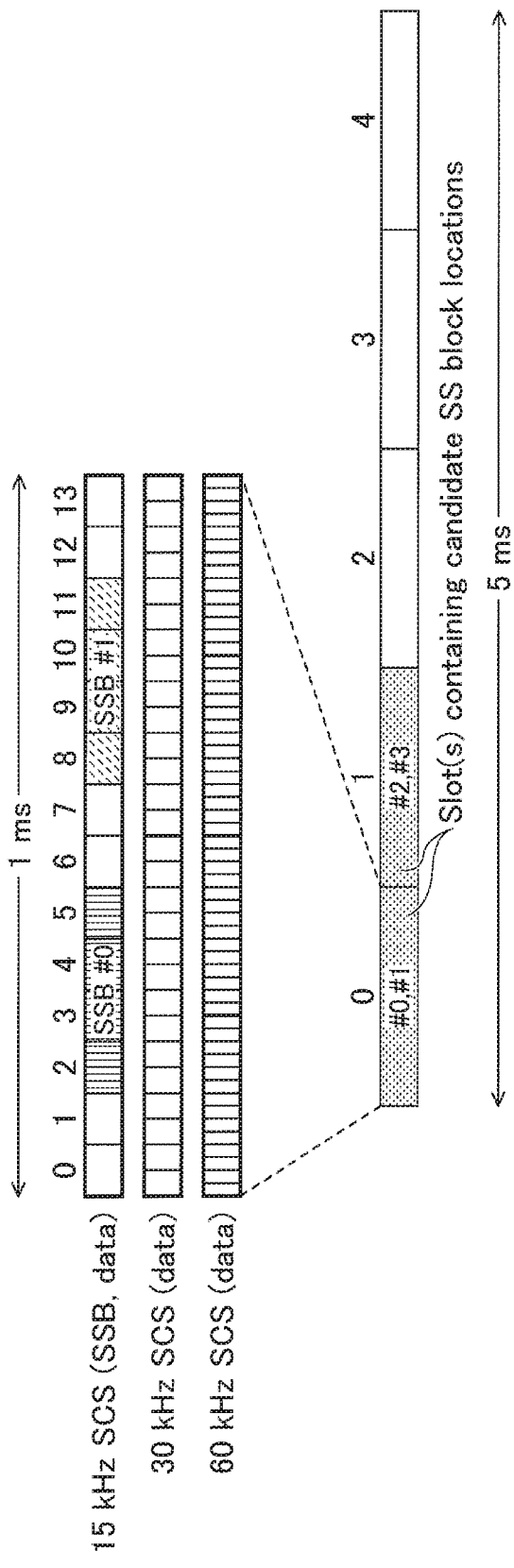
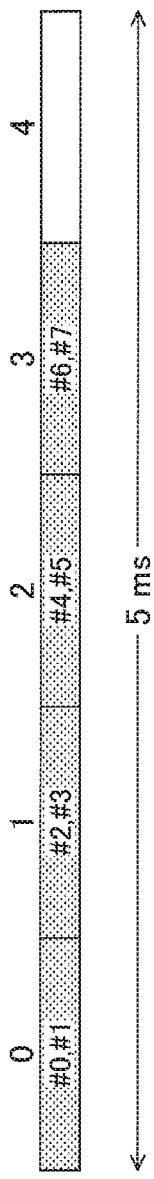
FIG.4

FIG.5
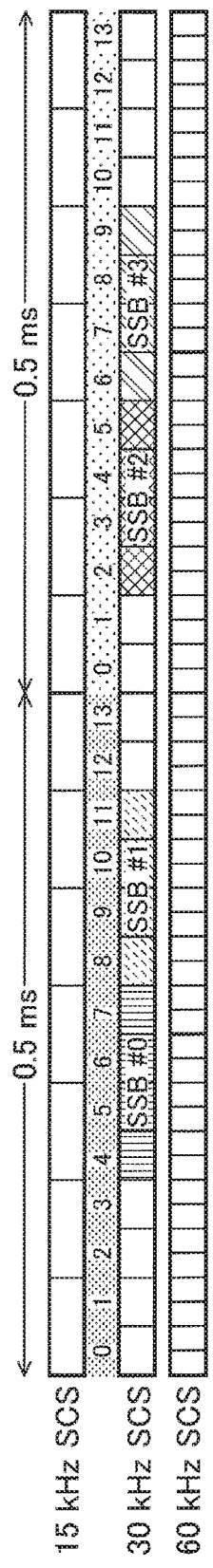
A) SLOT CONFIGURATION EXAMPLE 1 FOR SUBCARRIER SPACING OF SS BLOCK BEING 30 KHZ
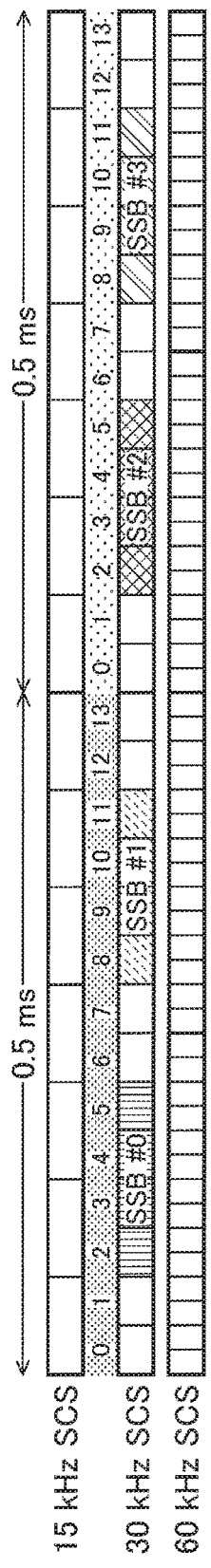
B) SLOT CONFIGURATION EXAMPLE 2 FOR SUBCARRIER SPACING OF SS BLOCK BEING 30 KHZ
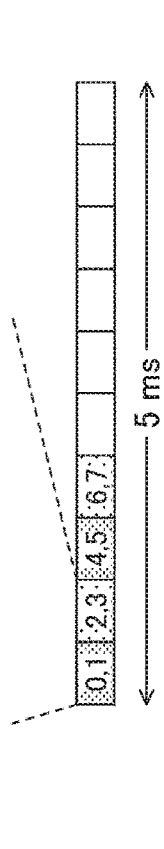
D) FREQUENCY BAND BEING FROM 3 GHZ TO 6 GHZ
C) FREQUENCY BAND BEING FROM 0 HZ TO 3 GHZ FIG.6
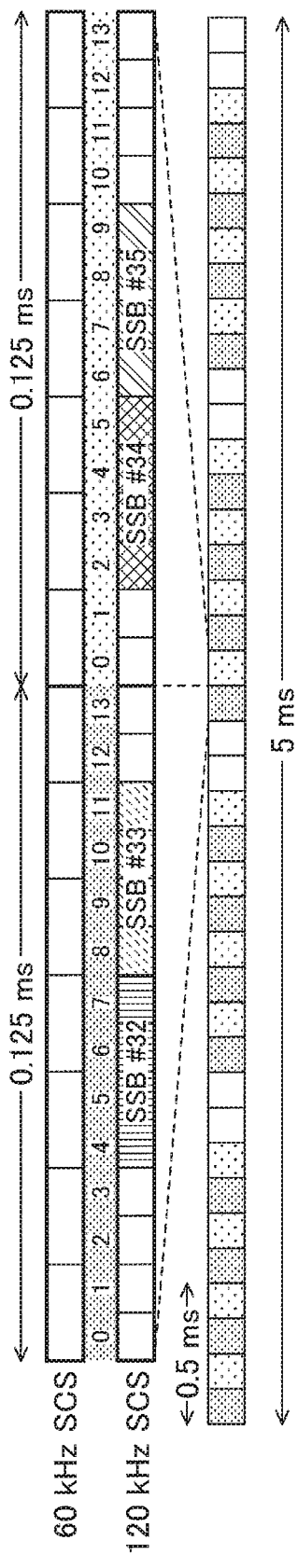
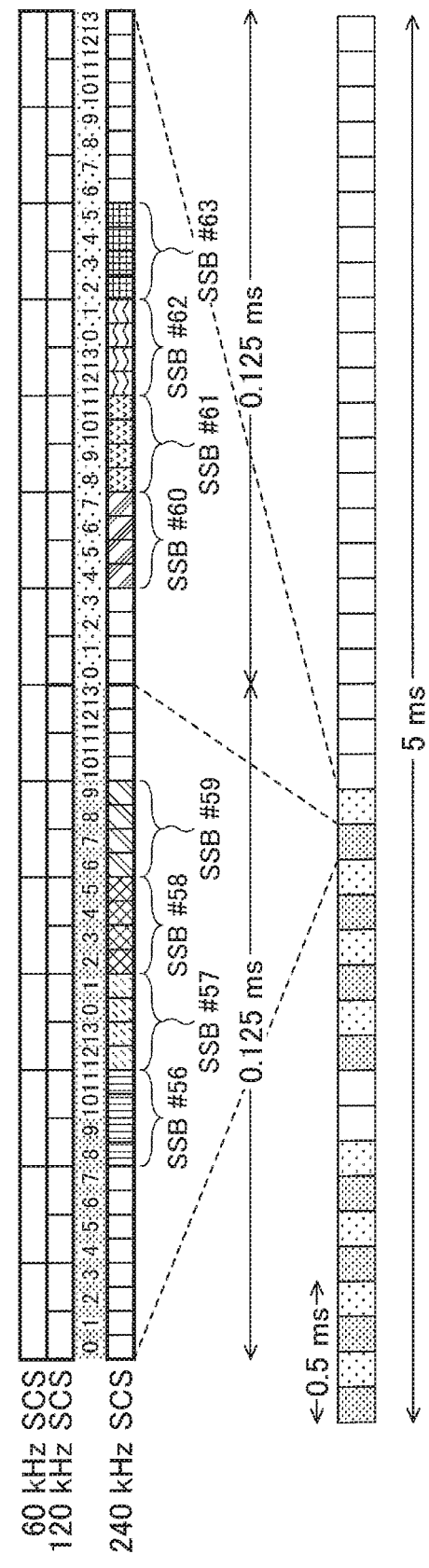

FIG.8

| Format | Downlink slot | | | Uplink slot | | |
|---|---|---|---|---|---|---|
| | Downlink | Unknown | Not downlink | Not uplink | Unknown | Uplink |
| 0 | – | 0–13 | – | – | 0–13 | – |
| 1 | 0–13 | – | – | – | – | 0–13 |
| 2 | 0–13 | – | – | – | – | – |
| 3 | – | – | – | – | – | 0–13 |
| 4 | 0 | 1–12 | 13 | 0 | 1–12 | 13 |

USER EQUIPMENT AND BASE STATION

TECHNICAL FIELD

The present invention relates to user equipment and a base station in a radio communication system.

BACKGROUND ART

In 3GPP (3rd Generation Partnership Project), radio communication systems called 5G or NR (New Radio) have been discussed (hereinafter, the radio communication systems are referred to as "5G" or "NR") in order to achieve further larger system capacity, further faster data transmission speed, further lower latency in a radio communication section, etc. In 5G, various wireless technologies have been discussed in order to meet requirements including latency equal to or less than 1 ms in a wireless section while achieving a throughput equal to or greater than 10 Gbps.

In NR, user equipment performs cell detection and cell identification based on a synchronization signal transmitted from a base station, and acquisition of a part of system information necessary for initial access during initial access where user equipment and a base station establish a connection (e.g., Non-Patent Document 1).

Further, NR is expected to use a wide frequency, ranging from a low frequency band similar to LTE (Long Term Evolution) to a higher frequency band than LTE. Specifically, the application of beam forming with a narrow beam width has been discussed in order to compensate for propagation loss because the propagation loss increases in high frequency bands (e.g., Non-Patent Document 1).

PRIOR ART DOCUMENTS

Non-Patent Documents

[NON-PATENT DOCUMENT 1] 3GPP TS 36.213 V14.4.0 (2017-09)
[NON-PATENT DOCUMENT 2] 3GPP TS 36.211 V14.4.0 (2017-09)

SUMMARY OF THE INVENTION

Problem to be Solved by the Invention

In NR, part of the synchronization signal and system information required for initial access are mapped to radio frames in a resource unit called SS block (Synchronization Signal block) composed of consecutive OFDM (Orthogonal Frequency Division Multiplexing) symbols. The user equipment receives the SS block transmitted from the base station and acquires the information required for initial access. The information required for initial access includes information identifying a RACH (Random Access Channel) resource and a preamble signal format.

In the NR, the base station also applies beam forming to transmit multiple beams. The user equipment receives the SS block associated with the beam and acquires the information required for initial access. The RACH resource is associated with SS block. In addition, in the NR, DL (Downlink) or UL (Uplink) can be flexibly set to the symbol of the slot that constitutes the radio frame.

Accordingly, when indicating, to the user equipment, the available RACH resources corresponding to the allocation of SS block and the configuration of the DL or UL in the NR, signaling overhead would be large when indicating all the information for identifying the RACH resources, i.e., locations of the RACH resources in time and frequency domains, a preamble index, the associated SS block, etc.

The present invention has been made in light of the above-described points, and an object of the present invention is to efficiently indicate, to user equipment, available resources for random access in a radio communication system.

Means for Solving the Problem

According to a disclosed technology,
user equipment communicating with a base station via a radio frame is provided. The user equipment includes
user equipment for communicating with a base station via a radio frame, the user equipment comprising:
a receiver configured to receive, from the base station, information indicating a downlink region or an uplink region in the radio frame, and information on a RACH configuration table, the RACH configuration table indicating allocation of RACH resources associated with a time domain in the radio frame;
a control unit configured to identify an available RACH resource, based on the information indicating a downlink region or an uplink region, and the information on the RACH configuration table; and
a transmitter configured to transmit a preamble to the base station using the identified available RACH resource, wherein
the information indicating the downlink region or the uplink region includes an unknown region that can be used for one of downlink and uplink, and wherein
availability of the RACH resource included in the unknown region is explicitly or implicitly identified in a case where the information on the RACH configuration table indicates that the RACH resource is allocated to the unknown region.

Advantage of the Invention

According to the disclosed technique, available resources can be efficiently indicated to user equipment for random access in the radio communication system.

BRIEF DESCRIPTION OF DRAWINGS

FIG. 4 is a diagram illustrating a configuration example (1) of an SS burst set according to an embodiment of the present invention;

FIG. 5 is a diagram illustrating a configuration example (2) of an SS burst set according to an embodiment of the present invention;

FIG. 6 is a diagram illustrating a configuration example (3) of an SS burst set according to an embodiment of the present invention;

FIG. 8 is a diagram illustrating an example (1) of a slot format used in an embodiment of the present invention;

EMBODIMENTS FOR CARRYING OUT THE INVENTION

The following describes embodiments according to embodiments of the present invention with reference to the accompanying drawings. Note that the embodiments described below are merely examples and the embodiments to which the present invention is applied are not limited to the following embodiments.

In operations of a wireless communication system according to an embodiment of the present invention, conventional techniques may be used if necessary. It should be noted that, although the conventional techniques are relating to the existing LTE, the conventional techniques are not limited to the existing LTE. Further, it is assumed that the term "LTE" used in the present specification has, unless otherwise specifically mentioned, a broad meaning including a scheme of LTE-Advanced and a scheme after the LTE-Advanced (e.g., NR).

Further, in the following embodiments, the terms such as SS (Synchronization Signal), PSS (Primary SS), SSS (Secondary SS), PBCH (Physical broadcast channel), PRACH (Physical RACH), etc., are used for the sake of convenience. The signals, functions, etc., similar to those above, may be referred to different terms. Further, the above-described terms used in NR will be referred to as "NR-SS", "NR-PSS", "NR-SSS", "NR-PBCH", "NR-PRACH", etc.

Figure 1:
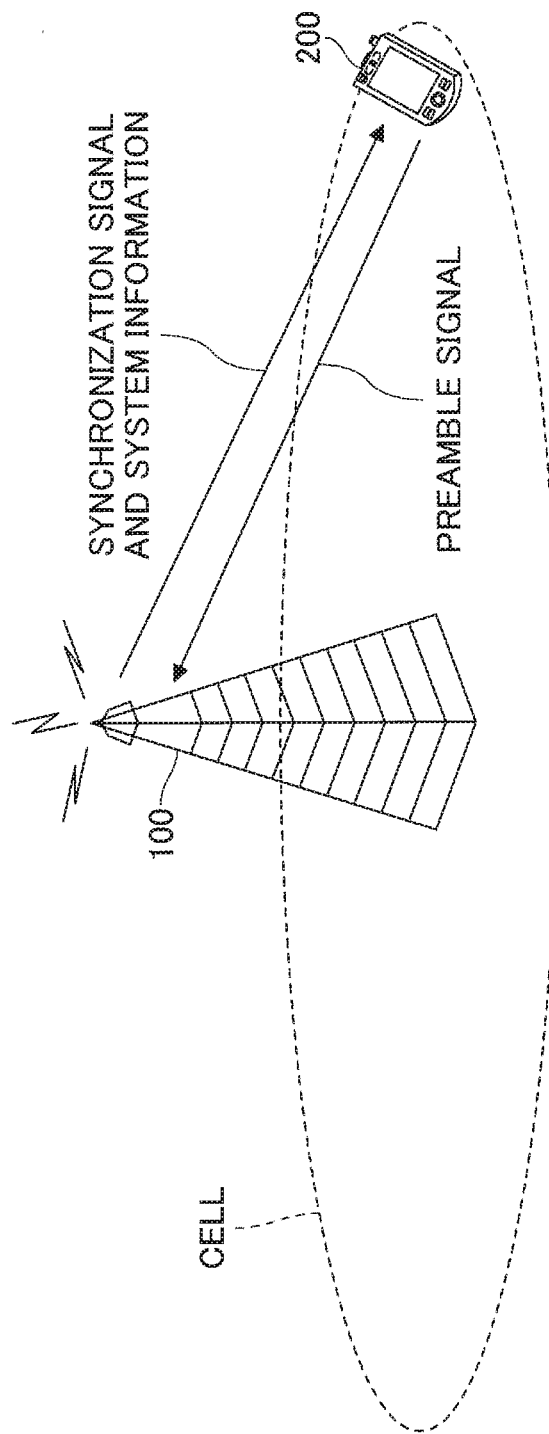
FIG. 1 is a diagram illustrating a configuration example of a radio communication system according to an embodiment of the present invention.

FIG. 1 is a diagram illustrating a configuration example of a radio communication system according to an embodiment of the present invention. The radio communication system according to an embodiment of the present invention includes a base station 100 and user equipment 200, as illustrated in FIG. 1. FIG. 1 depicts one base station 100 and one user equipment 200 each; however, this configuration of the radio communication system is merely an example. The configuration of the radio communication system may include two or more base stations 100 and two or more user equipment 200.

The base station 100 is a communication device that provides one or more cells and performs radio communication with the user equipment 200. As illustrated in FIG. 1, the base station 100 transmits a synchronization signal and system information to the user equipment 200. Synchronization signals are, for example, NR-PSS and NR-SSS. System information is transmitted, for example, by NR-PBCH. The system information is also referred to as broadcast information. Both the base station 100 and the user equipment 200 can perform beam forming to transmit and receive signals. User equipment 200 is a communication device having a radio communication function such as a smartphone, a cell phone, a tablet, a wearable terminal, a communication module for Machine-to-Machine (M2M), etc., which wirelessly connects to base station 100 and utilizes various communication services provided by a radio communication system. At the initial access stage, as illustrated in FIG. 1, the user equipment 200 transmits a random access preamble signal to the base station 100. The random access is performed based on NR-PBCH system information received from the base station 100 and RMSI (Remaining minimum system information), which is system information carried onto the NR-PDSCH (Physical downlink shared channel) scheduled by the NR-PDCCH (Physical downlink control channel). RMSI includes information required for initial access, e.g., RACH configurations.

In the present embodiment, the duplex scheme may be a TDD (Time Division Duplex) scheme, a FDD (Frequency Division Duplex) scheme, or other (e.g., Flexible Duplex, etc.) scheme.

In the following description, to transmit a signal using a transmission beam may be to transmit a signal multiplied by precoding vector (precoded with a precoding vector). Similarly, to receive a signal using a reception beam may be to multiply the received signal by a predetermined weight vector. Further, to transmit a signal using a transmission beam may also be expressed as to transmit a signal at a particular antenna port. Similarly, to receive a signal using a reception beam may be expressed as to receive a signal at a particular antenna port. The antenna port refers to a logical antenna port or a physical antenna port defined in the 3GPP standard. The method of forming the transmission beam and the reception beam is not limited to the above method. For example, in a base station 100 with multiple antennas and user equipment 200, a method of varying angles of each of antennas may be used; a method using a precoding vector may be combined with the method varying the angles of the antennas; a method of switching different antenna panels may be used; or different methods of combining multiple antenna panels may be used; or other methods may be used. Further, multiple mutually different transmission beams may be used in the high frequency band, for example. The use of multiple transmission beams is called a multibeam operation, and the use of a single transmission beam is called a single beam operation.

Embodiments

The following illustrates embodiments of the present invention.

Figure 2:
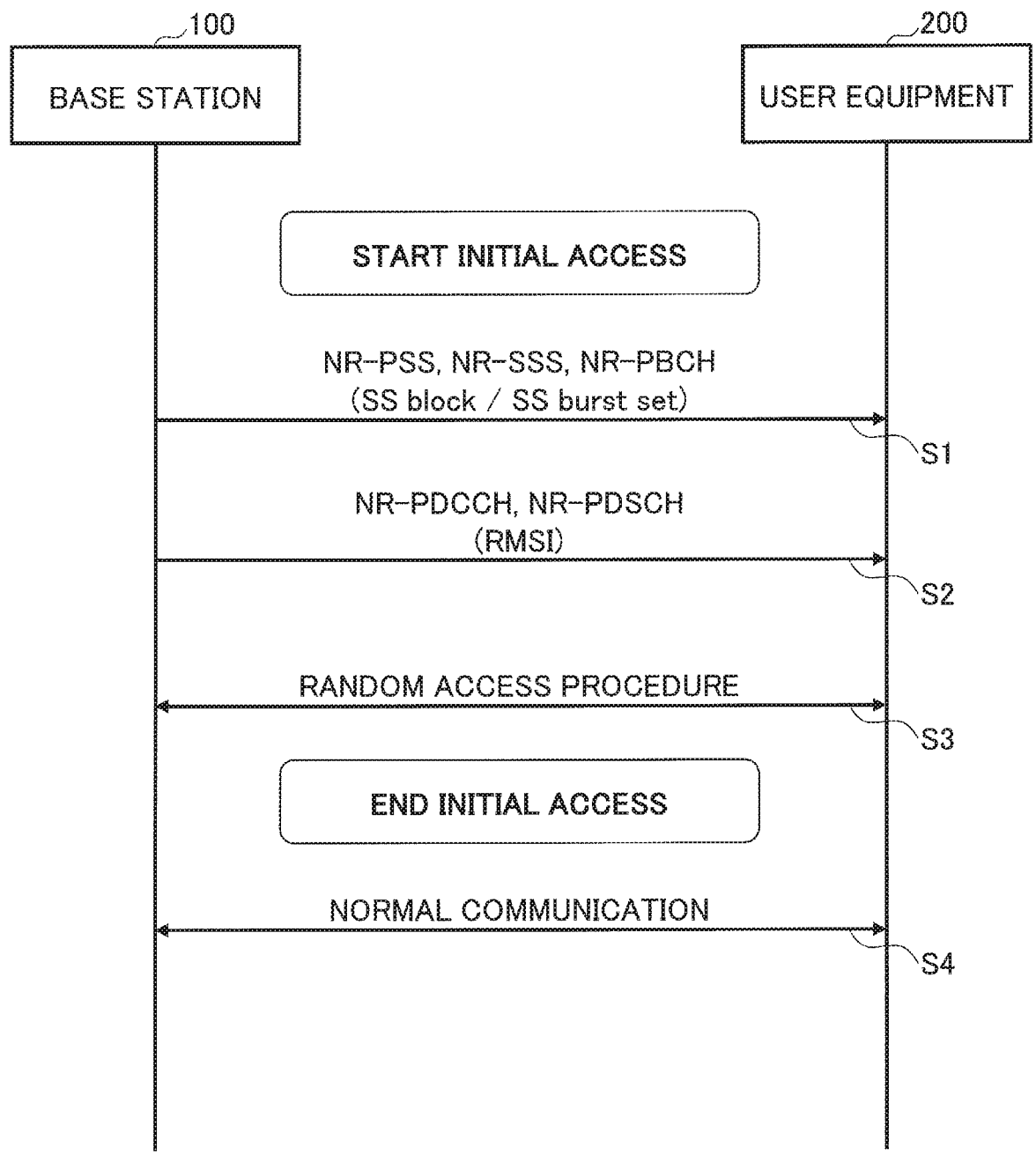
FIG. 2 is a diagram illustrating an example of an initial access sequence according to an embodiment of the present invention.

FIG. 2 is a diagram illustrating an example of an initial access sequence in an embodiment of the present invention. When initial access is initiated, in step S1, the base station 100 transmits NR-PSS, NR-SSS, and NR-PBCH, or SS block, to the user equipment 200. NR-PBCH contains part of the system information. The base station 100 repeatedly transmits the SS burst set including multiple SS blocks to the user equipment 200 in a period of SS burst set periodicity. If the SS burst set contains multiple SS blocks, multiple SS blocks may be associated with different beams in a multibeam operating environment.

The user equipment 200 receives NR-PSS transmitted from the base station 100 and uses the NR-PSS at least to identify some of the initial time and frequency synchronization, and cell identity. The user equipment 200 also receives NR-SSS transmitted from the base station 100 and uses the NR-SSS at least to identify a portion of the cell ID.

In addition, the user equipment 200 receives NR-PBCH transmitted from the base station 100 and acquires information for acquiring a portion of the system information necessary for initial access, such as the system frame number (SFN: System Frame Number) and RMSI and the like of other system information.

Subsequently, in step S2, other system information including RMSI is received via NR-PDSCH scheduled by NR-PDCCH. RMSI includes information that identifies resources, such as RACH resources and preamble formats, for performing random access procedures.

When the SS burst set contains multiple SS blocks, the user equipment 200, transmits, upon acquisition of a certain SS block, a preamble and starts a random access procedure with the RACH resource associated with the SS block (S3).

In step S3, when the random access procedure between the base station 100 and the user equipment 200 is successfully performed, initial access is completed, and normal communication is initiated (S4).

Figure 3:
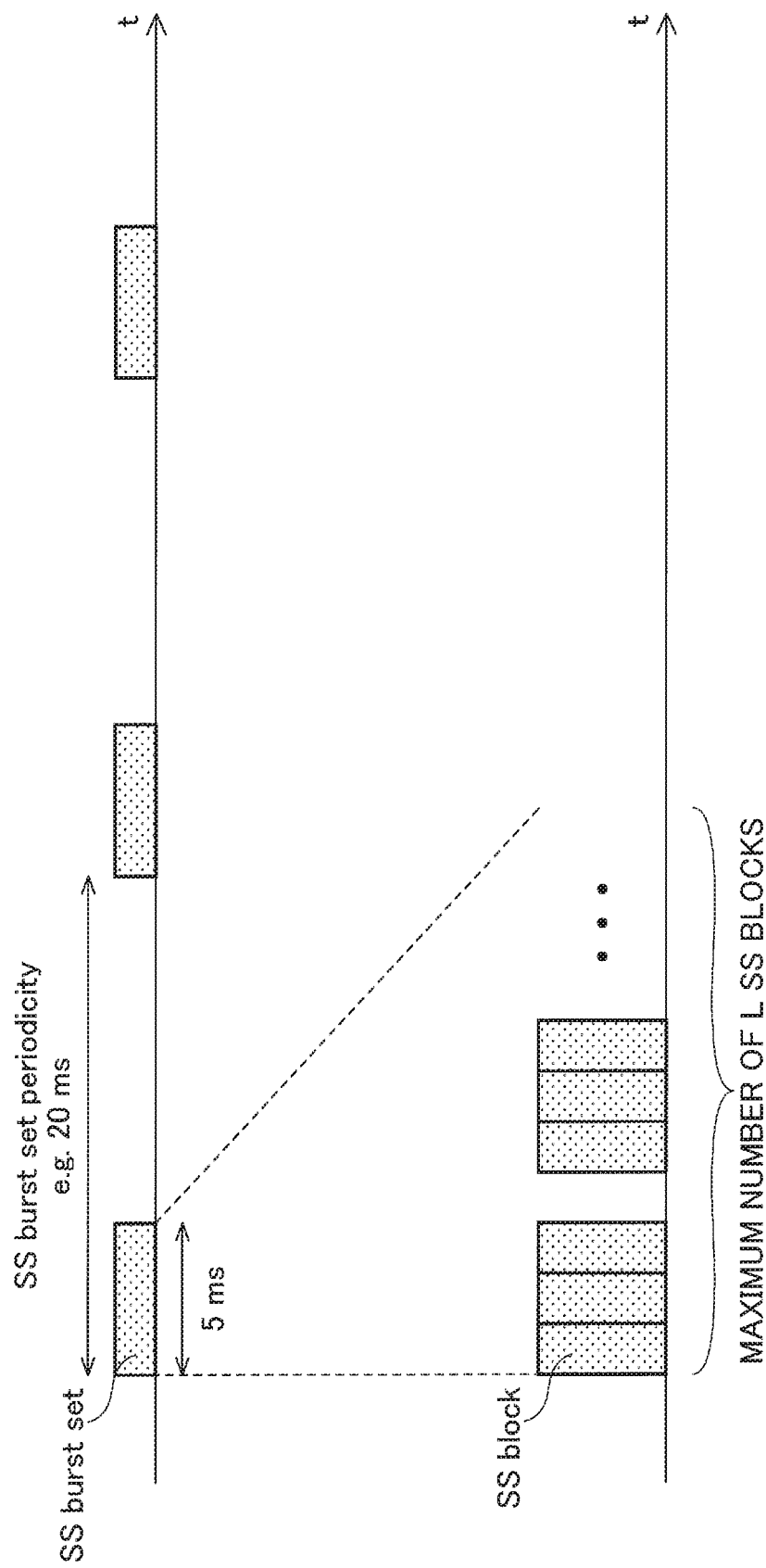
FIG. 3 is a diagram illustrating an SS burst set according to an embodiment of the present invention.

FIG. 3 is a diagram illustrating an SS burst set according to an embodiment of the present invention; As illustrated in FIG. 3, the SS burst set includes 1 to L SS blocks. Candidate resources to send SS blocks are included within a 5 ms period. Not all the SS blocks are allocated to L candidate positions in SS burst set, and L or less number of the SS blocks actually transmitted from the base station 100 are allocated according to operation. Resources at candidate positions where SS blocks are not allocated are used for normal communication. That is, L indicates the maximum number of SS blocks in the SS burst set. L also has different values according to the frequency band. For example, for frequencies below 3 GHz, L=4, for frequencies between 3 GHz and 6 GHz, L=8, and for frequencies between 6 GHz and 52.6 GHz, L=64.

In the example illustrated in FIG. 3, the SS burst set periodicity indicating a period during which the SS burst set is transmitted is 20 ms. The minimum value of SS burst set periodicity may be 5 ms.

FIG. 4 is a diagram illustrating a configuration example (1) of an SS burst set according to an embodiment of the present invention; FIG. 4 illustrates an example of an SS burst set configured in units of 5 ms or 1 ms on a radio frame.

FIG. 4(A) is an example of an SS burst set configuration where the subcarrier spacing of the radio signal to which SS block is transmitted is 15 kHz and the frequency band is up to 3 GHz. Of the five slots corresponding to 5 ms, the first two slots include an SS block (hereinafter referred to as "SSB"). SSB #0 and SSB #1 are allocated to slot #0, and SSB #2 and SSB #3 are allocated to slot #1. Slots having a length of 1 ms consist of 14 symbols #0 to #13. As illustrated in 4(A), SSB #0 is allocated from symbol #2 to symbol #5, and SSB #1 is allocated from symbol #8 to symbol #11, in a radio frame that is 15 kHz SCS (subcarrier spacing). A radio frame that is 15 kHz SCS is used to transmit and receive SSB and data, and radio frames that are 30 kHz SCS and 60 kHz SCS are used to transmit and receive data.

FIG. 4(B) is an example of an SS burst set where the subcarrier spacing of the radio signal to which SS block is transmitted is 15 kHz and the frequency band is from 3 GHz to 6 GHz. Of the five slots corresponding to 5 ms, the first four slots include an SS block. SSB #0 and #1 are allocated in the slot #0, SSB #2 and #3 are allocated in the slot #1, SSB #4 and SSB #5 are allocated in the slot #2, and SSB #6 and SSB #7 are allocated in the slot #3. The allocation of the SS blocks on the symbols in a slot may be the same as in FIG. 4(A).

FIG. 5 is a diagram illustrating a configuration example (2) of an SS burst set according to an embodiment of the present invention. FIG. 5 illustrates an example of an SS burst set configured in time units of 5 ms or 1 ms on a radio frame.

FIG. 5(A) is a configuration example of an SS burst set in slots when the subcarrier spacing of the radio signal to which SS block is transmitted is 30 kHz. SSB #0 is allocated from symbol #4 to symbol #7, and SSB #1 is allocated from symbol #8 to symbol #11 in the slot. SSB #2 is allocated from symbol #2 to symbol #5, and SSB #3 is allocated from symbol #6 to symbol #9 in the subsequent slot. SSB #0 to SSB #3 are allocated in two consecutive slots. A radio frame, which is a 30 kHz SCS, is used to transmit and receive SSB and data, and radio frames, which are a 15 kHz SCS and a 60 kHz SCS, are used to transmit and receive data.

FIG. 5(B) is another configuration example of the SS burst set in slots when the subcarrier spacing of the radio signal to which the SS block is transmitted is 30 kHz. SSB #0 is allocated from symbol #2 to symbol #5, and SSB #1 is allocated from symbol #8 to symbol #11 in the slot. SSB #2 is allocated from symbol #2 to symbol #5, and SSB #3 is allocated from symbol #8 to symbol #11 in the subsequent slot. SSB #0 to SSB #3 are allocated in two consecutive slots. A radio frame, which is a 30 kHz SCS, is used to transmit and receive SSB and data, and radio frames, which are a 15 kHz SCS and a 60 kHz SCS, are used to transmit and receive data.

FIG. 5(C) illustrates an example of an SS burst set when the frequency band of the radio signal to which SS block is transmitted is from 0 Hz to 3 GHz in 5 ms slot units. Slots are defined as slot #0 to slot #9 in the order of time. As illustrated in FIG. 5C, SSB #0 and SSB #1 are allocated in the slot #0, and SSB #2 and SSB #3 are allocated in the slot #1.

FIG. 5(D) illustrates an example of an SS burst set when the frequency band of the radio signal to which the SS block is transmitted is from 3 GHz to 6 GHz in 5 ms slot units. Slots are defined as slot #0 to slot #9 in the order of time. As illustrated in FIG. 5(D), SSB #0 and SSB #1 are allocated in the slot #0, SSB #2 and SSB #3 are allocated in the slot #1, SSB #4 and SSB #5 are allocated in the slot #2, and SSB #6 and SSB #7 are allocated in the slot #3.

FIG. 6 is a diagram illustrating a configuration example (3) of an SS burst set according to an embodiment of the present invention. FIG. 6 illustrates an example of an SS burst set configured in time units of 5 ms or 0.25 ms on a radio frame.

FIG. 6(A) is a configuration example of an SS burst set where the subcarrier spacing of the radio signal to which SS block is transmitted is 120 kHz and the frequency band is 52.6 GHz. The slots indicated in slot unit of 5 ms may be defined as slot #0 to slot #39 arranged in the order of time. SSB #32 is allocated from symbol #4 to symbol #7, and SSB #33 is allocated from symbol #8 to symbol #11 in slot #20. SSB #34 is allocated from symbol #2 to symbol #5, and SSB #35 is allocated from symbol #6 to symbol #9 in slot #22. With a similar slot configuration, SSB #0 to SSB #15 are allocated from slot #0 to slot #7, SSB #16 to SSB #31 are allocated from slot #10 to slot #17, SSB #32 to SSB #47 are allocated from slot #20 to slot #27, and SSB #48 to SSB #63 are allocated from slot #30 to slot #37. A radio frame that is 120 kHz SCS may be used to transmit and receive SSB and data, and a radio frame that is 60 kHz SCS may be used to transmit and receive data.

FIG. 6(B) is a configuration example of an SS burst set with a subcarrier spacing of 240 kHz and a frequency band from 6 GHz to 52.6 GHz for the radio signal to which SS block is transmitted. The slots indicated in slot unit of 5 ms are defined as slot #0 to slot #79 arranged in the order of time. Note that in FIG. 6(B), one cell corresponds to two slots. SSB #56 is allocated from symbol #8 to symbol #11 of slot #32, SSB #57 is allocated from symbol #12 of slot #32 to symbol #1 of slot #33, SSB #58 is allocated from symbol #2 to symbol #5 of slot #33, and SSB #59 is allocated from symbol #6 to symbol #9 of slot #33. SSB #60 is allocated from symbol #4 to symbol #7 of slot #34, SSB #61 is allocated from symbol #8 to symbol #11 of slot #34, SSB #62 is allocated from symbol #12 of slot #34 to symbol #1 of slot 35, and SSB #63 is allocated from symbol #2 to symbol #5 of slot 35. With a similar slot configuration, SSB #0 to SSB #31 are allocated from slot #0 to slot #15, and SSB #32 to SSB #63 are allocated from slot #20 to slot #35. A radio frame that is 240 kHz SCS may be used to transmit and receive SSB, and a radio frame that is 60 kHz SCS and 120 kHz SCS may be used to transmit and receive data.

Figure 7:
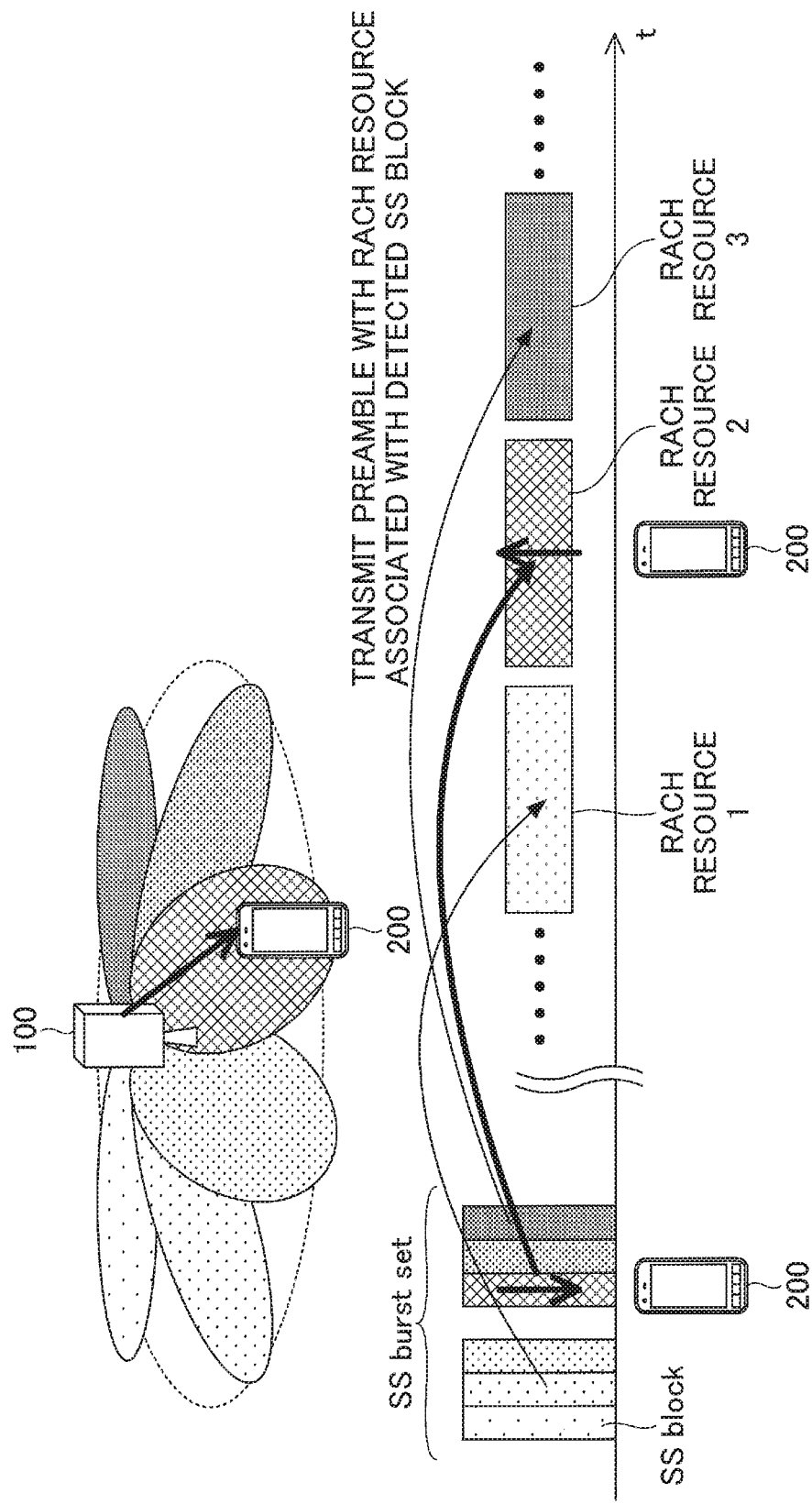
FIG. 7 is a diagram illustrating a RACH resource associated with an SS block according to an embodiment of the present invention.

FIG. 7 is a diagram illustrating a RACH resource associated with an SS block in an embodiment of the present invention. As illustrated in FIG. 7, in the NR, an SS burst set containing SS blocks associated with beams is transmitted from the base station 100. The user equipment 200 receives a detectable SS block and transmits a preamble with the RACH resource associated with the received SS block to initiate the initial access procedure. The RACH resources may each be associated with a beam.

In the example illustrated in FIG. 7, the user equipment 200 receives the fourth SS block contained in the SS burst set and transmits a preamble with the RACH resource 2 associated with the fourth SS block. In the example illustrated in FIG. 4, the second SS block in the SS burst set is associated with RACH resource 1, and the sixth SS block in the SS burst set is associated with RACH resource 3. The SS block also has a corresponding SS block index; for example, the SS block index of the fourth SS block included in SS burst set is defined as "4".

That is, as illustrated in FIG. 7, each of SS blocks may be associated with a RACH resource or a preamble index. Further, one SS block may be associated with multiple RACH resources or preamble indices. Further, multiple RACH resources in the time direction, multiple RACH resources in the frequency direction, or a range of multiple preamble indices may be associated with each of SS blocks.

As with LTE, RACH configuration tables are defined, and an index that specifies each RACH configuration table is indicated from the base station 100 to the user equipment 200 to identify a location, a number, density, etc. in time domain of available RACH resources in NR. The association between each of the indicated available RACH resources with the SS block may be indicated from the base station 100 to the user equipment 200 or may be predefined.

FIG. 8 is a diagram illustrating an example (1) of a slot format used in an embodiment of the present invention. FIG. 8 is an example of a slot format in NR, which is composed of two consecutive slots of a downlink slot and an uplink slot. In the example illustrated in FIG. 8, the format is defined as five ways: "0," "1," "2," "3," and "4". Each format defines the use of symbols that form a slot. The type of symbol in the downlink slot is any one of "Downlink" used for downlink, "Unknown" of which use for downlink or uplink is undetermined, or "Not downlink" not used for downlink. The type of symbol in the uplink slot is any one of "Not uplink" not used for uplink, "Unknown" of which use for downlink or uplink is undetermined, or "Uplink" used for uplink. One slot is composed of 14 symbols. Hereinafter, the nth symbol in a slot is designated as the symbol #n.

In format "0", the downlink slot is used by a symbol #0 to the symbol #13 as "Unknown", and the uplink slot is used by a symbol #0 to the symbol #13 as "Unknown". In format "1", the downlink slot is used by symbol #0 to symbol #13 as a "Downlink", and the uplink slot is used by symbol #0 to symbol #13 as an "Uplink". In format "2", the downlink slot is used by symbol #0 to symbol #13 as a "Downlink", and the uplink slot is not defined. In format "3", the downlink slot is not defined, and the uplink slot is used by symbol #0 to symbol #13 as a "Downlink". In format "4", the downlink slot is used by the symbol #0 as "Downlink", by the symbol #1 to the symbol #12 as "Unknown", and by the symbol #13 as "Not downlink"; and the uplink slot is used by the symbol #0 as "Not uplink", by the symbol #1 to the symbol #12 as "Unknown", and by the symbol #13 as "Uplink". The formats illustrated in FIG. 8 are merely examples, and each symbol may be flexibly specified for use.

Figure 9:
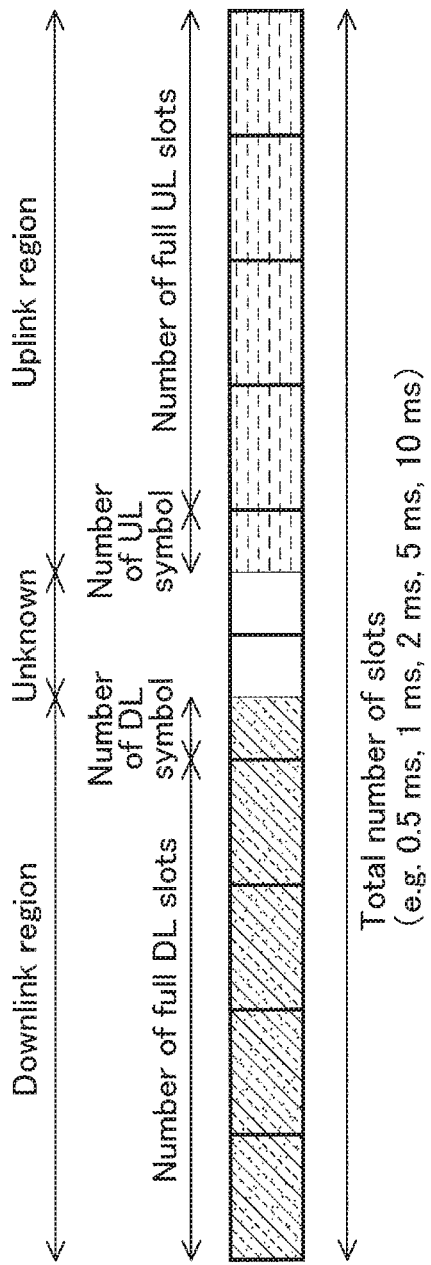
FIG. 9 is a diagram illustrating an example (2) of a slot format used in an embodiment of the present invention.

FIG. 9 is a diagram illustrating an example of a slot format used in an embodiment of the present invention. FIG. 9 is a DL/UL assignment having a format that defines a slot or symbol corresponding to DL, UL, and Unknown for a period of 10 slots.

To indicate a format illustrated in FIG. 9, the following parameters may be indicated to the user equipment 200 from the base station 100.
1) Total Number of slots: a total number of slots
2) Number of DL full DL slots: a total number of full DL slots in which DL symbols are allocated
3) Number of DL symbols: the number of DL symbols in a slot (5th slot in FIG. 9)
4) Number of UL symbols: the number of UL symbols in a slot (number of UL symbols)
5) Number of full UL slots: a total number of full UL slots where all UL symbols are located
Note that not all of the above parameters may be indicated to the user equipment 200, and some of the above parameters may be predefined.

Unlike the format described in FIG. 8, the number of slots to which only DL symbols are allocated, the number of DL symbols in slots to which only some DL symbols are allocated, the number of UL symbols in slots to which only some UL symbols are allocated, and the number of slots to which only UL symbols are allocated may be indicated to the user equipment 200 in FIG. 9. In FIG. 9, a total number of slots (10 slots in FIG. 9) representing a period during which the format is repeated may be indicated to the user equipment 200 or may be predetermined. The total number of slots may be indicated by a time length such as 0.5 ms, 1 ms, 2 ms, 5 ms, 10 ms, etc., as illustrated in FIG. 9, and may be indicated to the user equipment 200 or may be predefined. The location that is not designated to be used for DL or UL is "Unknown". According to the format depicted in FIG. 9, first, full DL slots to which only DL symbols are allocated, next, slots containing "Unknown", and finally, full UL slots to which only UL symbols are allocated are arranged in this order in the time domain.

In NR, the number L of transmission candidate positions of the SS blocks in the time domain described in FIG. 3 is determined in advance. The number of SS blocks actually transmitted is flexibly determined within the number of SS blocks L or less. Accordingly, it is difficult to determine a RACH configuration table with respect to a time domain that matches all SS block allocation patterns, that is, a location of RACH resource in the time domain.

As compared to the TDD configuration in LTE, NR can provide flexible DL/UL assignment as illustrated in FIG. 8; accordingly, it is expected that a format defining DL/UL assignment for a long period exceeding two slots may be used. Thus, it is difficult to define a RACH configuration table with respect to a time domain that matches all DL/UL patterns.

Further, when the format illustrated in FIG. 9 is used, UL being present only in the later slot per total number of slots of the format may be considered; thus, it is necessary to take into account the total number of slots in the format when determining the allocation of the RACH resource in the time domain.

Figure 10:
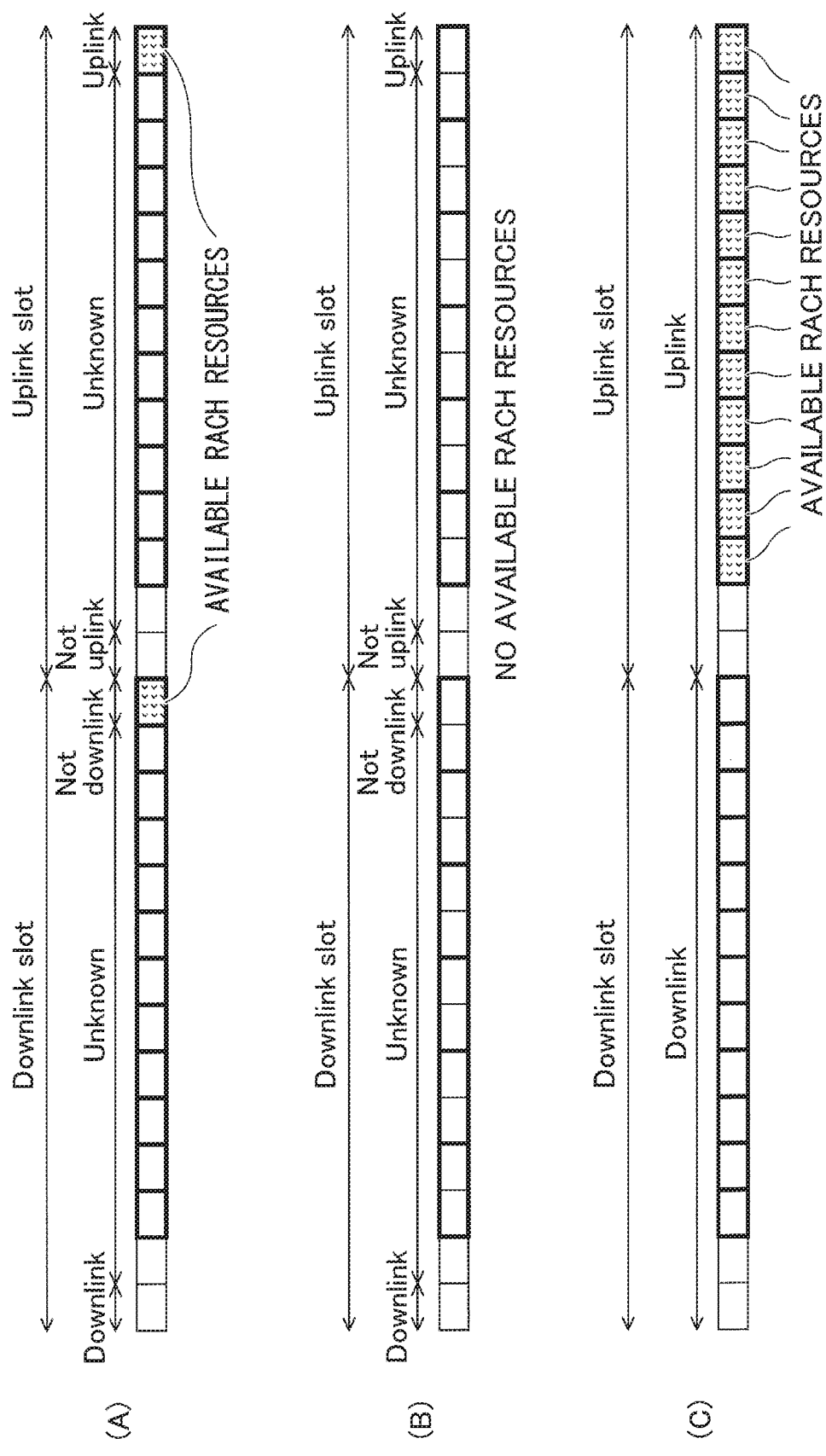
FIG. 10 is a diagram illustrating an example (1) of RACH resources in an embodiment of the present invention.

FIG. 10 is a diagram illustrating an example (1) of the allocation of RACH resources according to an embodiment of the present invention. FIG. 10 illustrates examples of available RACH resources that are allocated in a downlink slot and an uplink slot in accordance with the RACH configuration table in NR. A thin frame line indicates one symbol, and a thick frame line indicates one RACH resource.

Based on the DL/UL assignment indicated to the user equipment 200 by the broadcast information, etc., RACH resources other than the resources (symbols) corresponding to the UL may be excluded from the available RACH resources, from among the RACH resources allocated to positions in the time domain, based on the index specifying the RACH configuration table or the RACH configuration table indicated to the user equipment 200 by the broadcast information, etc. That is, the user equipment 200 may use RACH resources other than the excluded RACH resources, from among the RACH resources assigned to the positions in the time domain, based on the RACH configuration table or index specifying table. Associations with SS blocks may be specified with respect to RACH resources other than the excluded RACH resources. Further, the excluded RACH resources may be used for scheduling data channels or control channels in the base station 100.

FIG. 10(A) illustrates available RACH resources when a time length of a PRACH preamble format is 1 symbol and a slot format is "Format 4" as described in FIG. 8. In Format 4, the symbol #0 is "Downlink", the symbol #1 to the symbol #12 are "Unknown", and the symbol #13 is "Not downlink", in the downlink slot. In Format 4, the symbol #0 is "Not uplink", the symbol #1 to the symbol #12 are "Unknown", and the symbol #13 is "Uplink", in the uplink slot. In the downlink slot, RACH resources that overlap the symbols of "Downlink" and "Unknown" in the downlink slot are excluded, and a RACH resource that overlaps the symbol "Not downlink Symbol" is made available. In the uplink slot, RACH resources that overlap the symbols "Not uplink symbol" and "Unknown" are excluded, and a RACH resource that overlaps the symbol "Uplink" is made available. Thus, as illustrated in FIG. 10A, the symbol #13 of the downlink slot and the symbol #13 of the uplink slot become available RACH resources.

FIG. 10(B) illustrates a case where the time length of the PRACH preamble format is 2 symbols and the slot format is "Format 4" as described in FIG. 8. In Format 4, the symbol #0 is "Downlink", the symbol #1 to the symbol #12 are "Unknown", and the symbol #13 is "Not downlink", in the downlink slot. In Format 4, the symbol #0 is "Not uplink", the symbol #1 to the symbol #12 are "Unknown", and the symbol #13 is "Uplink", in the uplink slot. In the downlink slot, RACH resources that overlap the symbols of "Downlink" and "Unknown" in the downlink slot are excluded, and a RACH resource that overlaps the symbol "Not downlink Symbol" is made available. In the uplink slot, RACH resources that overlap the symbols "Not uplink symbol" and "Unknown" are excluded, and a RACH resource that overlaps the symbol "Uplink" is made available. Thus, as illustrated in FIG. 10B, the symbol #13 of the downlink slot and the symbol #13 of the uplink slot become available RACH resources. However, because the time length of the PRACH preamble format is two symbols, there are no available RACH resources.

FIG. 10(C) illustrates available RACH resources when the time length of the PRACH preamble format is 1 symbol and the slot format is "Format 1" as described in FIG. 8. In Format 1, the symbols #0 to #13 are "Downlink" in the downlink slot, and the symbols #0 to #13 are "Uplink" in the uplink slot. RACH resources that overlap the symbol "Downlink" in the downlink slot are excluded. RACH resources that overlap the symbol "Uplink" in the uplink slot are available. Thus, as illustrated in FIG. 10(C), the symbol #13 of the downlink slot and the symbol #13 of the uplink slot become available RACH resources.

As another example, RACH resources that overlap the symbols "Downlink" and "Unknown" in the downlink slot may be excluded, and RACH resources that overlap the symbols "Not Downlink Symbol" may be available. As another example, RACH resources that overlap the symbol "Not uplink symbol" may be excluded and RACH resources that overlap the symbols "Unknown" and "Uplink" may be available.

Figure 11:
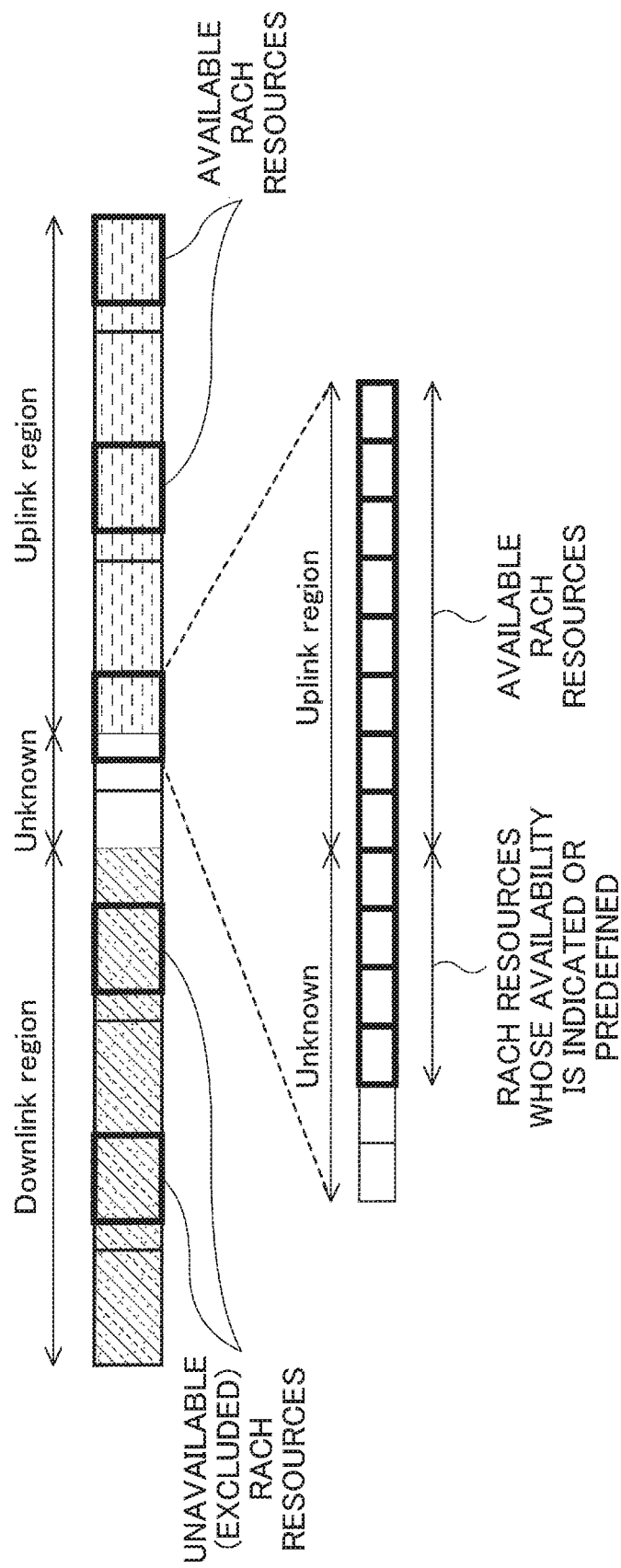
FIG. 11 is a diagram illustrating an example (2) of RACH resources in an embodiment of the present invention.

FIG. 11 is a diagram illustrating an example (2) of a RACH resource in an embodiment of the present invention. FIG. 11 illustrates an example in which the RACH resources available in accordance with the RACH configuration table in NR are allocated to a slot in the format described in FIG. 9. A thin border indicates one slot or one symbol, and a thick border indicates a candidate RACH resource. FIG. 11 illustrates available RACH resources in a slot where the time length of PRACH preamble format is 1 symbol.

As illustrated in FIG. 11, RACH resources allocated to "Downlink region" are excluded. RACH resources allocated to "Uplink region" are available. In the slots including "Unknown" and "Uplink Region" illustrated in FIG. 11, whether or not RACH resources are available on a per symbol unit basis is determined. The RACH resources allocated to the symbols included in the "Uplink region" are available. Availability of RACH resources allocated to symbols included in "Unknown" may be indicated or predefined.

That is, when DL/UL assignment with the format illustrated in FIG. 11 is applied, the RACH resources included in a range explicitly allocated as DL slots or DL symbols are excluded from the available RACH resources. RACH resources that overlap the range of Unknown, to which the DL slot, DL symbol, UL slot, or UL symbol is not explicitly allocated, are excluded from available RACH resources.

As another example, in a case where DL/UL assignment with the format illustrated in FIG. 11 is applied, RACH resources included in the range explicitly allocated as DL slots or DL symbols are excluded from available RACH resources. RACH resources that overlap the range of Unknown, to which the DL slot, DL symbol, UL slot, or UL symbol is not explicitly allocated, may also be used as available RACH resources.

As another example, when a DL/UL assignment having the format illustrated in FIG. 11 is applied, and the total number of slots is indicated by the base station 100 to the user equipment 200 or predetermined, the RACH resources in the time domain specified as an index of the RACH configuration table may be implicitly or explicitly indicated to the user equipment 200 based on the time length of the total number of slots.

The indication unit of the time domain in the RACH configuration table may be indicated in symbol units, in slot units, in subframe units, i.e., in units of 1 ms, or in SFN units, i.e., in units of 10 ms.

If information indicating time domain in the RACH configuration table is indicated in large units of time length, the RACH resource may be allocated by all the smaller units of time length that are smaller than large units of time length, or how part of the smaller units of time length is allocated may be further indicated or predefined by the RACH configuration table. For example, when a time length is indicated in subframe units, then an even number of slots and symbols #3 through #13 that are allocated as RACH resources may be indicated by the RACH configuration table.

As another example, a DL/UL assignment having the format illustrated in FIG. 11 may be applied, and the density of the allocation of RACH resources per total number of slots may be indicated by the RACH configuration table. For example, an index of RACH configuration table may be defined such that RACH resources are allocated in a period in which the total number of slots is repeated four times. Alternatively, an index of RACH configuration table may be defined such that RACH resources are allocated in a period in which the total number of slots is repeated once. That is, the absolute value of the actual repetition period is determined by the total number of slots.

As another example, an index of the RACH configuration table may be defined for each expected number of slots. For example, expecting the total number of slots of 1 ms, RACH resource allocation with a 1 ms period of high density allocation or a 4 ms period of low density allocation may be defined for each index of the RACH configuration table.

The index may be utilized only in a case where the total number of slots equal to the total number of slots expected for each index of the RACH configuration table is indicated by the base station 100. Further, the index may be utilized even in a case where another total number of slots is indicated from the base station 100. For example, in a case where the RACH resource allocation for a 4 ms period, expecting the total number of slots of 1 ms, is specified by an index of a RACH configuration table, a high density RACH resource allocation may be performed using the same index, e.g., expecting the total number of slots of 4 ms.

Alternatively, RACH configuration table may be defined such that RACH resources are allocated in a period that is a maximum possible value to be taken as a total number of slots, e.g., a multiple of 10 ms.

As another example, when DL/Unknown/UL assignment having the format illustrated in FIG. 11 is applied, the form to exclude unavailable RACH resources from among the RACH resources indicated via the RACH configuration table may be indicated from the base station 100 to the user equipment 200 or may be predefined. For example, in a case where the "Unknown" region illustrated in FIG. 11 overlaps with the RACH resource indicated by the RACH configuration table, information indicating whether the RACH resource included in the "Unknown" region is in a form that is excluded as an unavailable RACH resource, or the RACH resource included in the "Unknown" region is in a form that is not excluded as an unavailable RACH resource may be indicated to the user equipment 200 from the base station 100 or may be predefined.

As another example, information relating to which range of RACH resources are excluded as unavailable RACH resources may be indicated from the base station 100 to the user equipment 200 in the RACH configuration (RACH-config) in case where semi-static DL/Unknown/UL assignment having the format illustrated in FIG. 11 cannot be acquired when the user equipment 200 performs random access. For example, information indicative of a point switching from DL to UL may be indicated from the base station 100 to the user equipment 200 or may be predetermined. A point switching from DL to UL may be indicated, for example, by an index of the symbol, an index of the slot, or indices of both the symbol and the slot. The user equipment 200 may be notified of a point switching from DL to UL to identify, for example, that a RACH resource after the symbol switching to UL is available from among RACH resources indicated by the RACH configuration table.

As another example, in a case where DL/Unknown/UL assignment having the format illustrated in FIG. 11 is applied, the user equipment 200 may determine in advance to expect that a part of the RACH resource indicated by the RACH configuration table that overlaps the "Unknown" region is actually "Uplink region". For example, in FIG. 11, in a case where "RACH resources that are not available (excluded)", "RACH resources that are indicated or predefined to be available" and "RACH resources that are available" are RACH resources that are indicated by the RACH configuration table, the user equipment 200 may expect that four symbols are "Uplink Region" because the RACH resources indicated by the RACH configuration table overlap the four symbols out of six symbols in "Unknown" region.

As another example, in a case where DL/Unknown/UL assignment having the format illustrated in FIG. 11 is applied, it may be predefined that the base station 100 must actually schedule the user equipment 200 in the cell such that a part overlapping with the "Unknown" region, from among the RACH resources indicated by the RACH configuration table, is an "Uplink region". For example, in FIG. 11, in a case where "RACH resources that are not available (excluded)", "RACH resources that are indicated or predefined to be available or unavailable" and "RACH resources that are available" are RACH resources that are indicated by the RACH configuration table, the base station 100 may schedule the user equipment 200 such that four symbols are "Uplink Region"; this is because the RACH resources indicated by the RACH configuration table overlap the four symbols out of six symbols in "Unknown" region.

As another example, in a case where DL/Unknown/UL assignment with the format illustrated in FIG. 11 is applied, the availability or non-availability of RACH resources indicated by the RACH configuration table allocated to the "Unknown" region may be implicitly switched. For example, in a case where the user equipment 200 is in connected-mode, the RACH resource indicated by the RACH configuration table allocated to the "Unknown" region being available may be indicated or predefined; in a case where the user equipment 200 is in idle-mode, the RACH resource indicated by the RACH configuration table allocated to the "Unknown" region being unavailable may be indicated or predefined. As a result of the above processing, the user equipment 200 does not use the "Unknown" region as a RACH resource because the information that can be obtained at the time of initial access is limited, while the user equipment 200 uses the "Unknown" region as a RACH resource based on the information that can be obtained at the time of connection.

Further, in a case where the user equipment 200 is in connected-mode, the user equipment 200 may determine which part of the RACH resources is available from among the RACH resources indicated by the RACH configuration table allocated to the "Unknown" region, based on information indicating which part of the "Unknown" region is used as a DL or UL indicated by the base station 100 by a DCI (Downlink Control Information) or the like. The RACH resources indicated by the RACH configuration table, which are clearly allocated to the "Unknown" region which is a DL region, may be excluded from the available RACH resources, based on information indicating which part of the "Unknown" region indicated by the base station 100 is used as DL or UL. The RACH resources indicated by the RACH configuration table, which are allocated to a "Unknown" region other than the part that is clearly a UL region in the "Unknown" region, may be excluded from the available RACH resources, based on information indicating which part of the "Unknown" region indicated by the base station 100 is used as a DL or UL.

As another example, in a case where DL/Unknown/UL assignment with the format illustrated in FIG. 11 is applied, availability or non-availability of the RACH resources indicated by the RACH configuration table allocated to the "Unknown" region may be determined, based on a BWP (Bandwidth Part) where the RACH resources are allocated. BWP is a frequency range in a frequency carrier set by the base station 100. For example, in BWPs other than the BWP of the UL used for initial access, RACH resources indicated by the RACH configuration table allocated to the "Unknown" region may be available. In the BWP of the UL used for initial access, the RACH resources indicated by the RACH configuration table allocated to the "Unknown" region may be excluded from the available RACH resources. Note that whether or not a BACH resource indicated by the RACH configuration table allocated to the "Unknown" region is available may be determined based on the BWP as follows; when the user equipment 200 is in connected-mode, the RACH resource indicated by the RACH configuration table allocated to the "Unknown" region being available may be notified or predefined; or when the user equipment 200 is in idle-mode, the RACH resource indicated by the RACH configuration table allocated to the "Unknown" region being not available may be indicated or predefined, in the BWP of the UL used for initial access, as described above.

Figure 12:
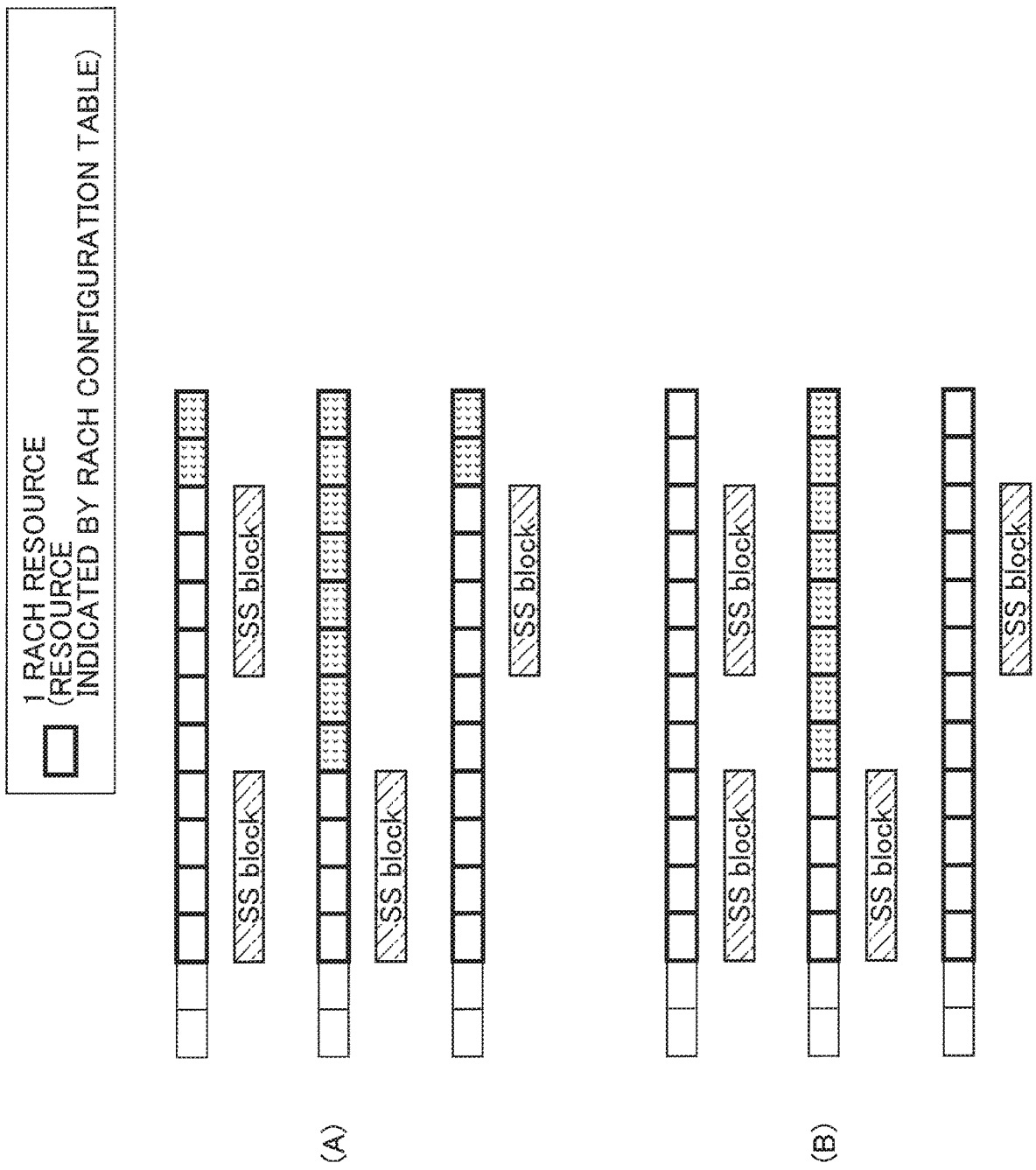
FIG. 12 is a diagram illustrating an example (3) of RACH resources in an embodiment of the present invention.

FIG. 12 is a diagram illustrating an example (3) of a RACH resource in an embodiment of the present invention. FIG. 12 is an example in which the available RACH resources indicated by the RACH configuration table in NR are allocated to a slot that includes SS blocks in the time domain. A thin frame line indicates one symbol, and a thick frame line indicates one RACH resource.

Among RACH resources allocated at positions in the time domain based on a RACH configuration table indicated to a UE 200 by broadcast information or based on an index specifying the RACH configuration table, RACH resources allocated to a slot at positions that overlap in the time domain with the actually transmitted SS blocks may be excluded from the RACH resources some or all of which in the slot are available. When the duplex method is only TDD, the exclusion of the RACH resources based on the allocated positions in the time domain of the SS blocks that are actually transmitted may apply. Associations with SS blocks may be specified with respect to RACH resources other than the excluded RACH resources. Further, the excluded RACH resources may be used for scheduling data channels or control channels in the base station 100.

FIG. 12A illustrates available RACH resources in a slot where a time length of a PRACH preamble format is one symbol. In a slot that overlaps SS blocks, RACH resources that exist later in the time domain than the last SS block actually transmitted may be made available. That is, in the first slot in FIG. 12(A), since SS block is allocated from a symbol #2 to a symbol #5, and SS block is allocated from a symbol #8 to a symbol #11, symbols #12 and #13 are available RACH resources.

In the second slot in FIG. 12(A), since SS block is allocated from a symbol #2 to a symbol #5, symbols #6 to #13 are available BACH resources.

In the third slot in FIG. 12(A), since SS block is allocated from a symbol #8 to a symbol #11, symbols #12 to #13 are available RACH resources.

As another example, FIG. 12B depicts RACH resources available in a slot where a time length of a PRACH preamble format is one symbol. In this example, two SS blocks are actually transmitted in a slot that overlaps SS blocks. In a case where only the earlier SS block ahead in the time domain is actually transmitted, from among the two SS blocks at transmission candidate positions, the RACH resources, which exist in the symbols later in the time domain than the symbol containing the earlier SS block, are available. When the later one of the two SS blocks in the time domain or both of the two SS blocks are actually transmitted, all RACH resources in the slot are excluded from the available RACH resources. That is, since two SS blocks are both transmitted in the first slot illustrated in FIG. 12B, there are no RACH resources available in the first slot. Since the earlier one of the two SS blocks in the time domain is transmitted in the second slot illustrated in FIG. 12B, symbols #6 to #13 are available RACH resources. Since the later one of the two SS blocks at transmission candidate positions in the time domain is transmitted in the third slot illustrated in FIG. 12B, there are no RACH resources available in the third slot.

As another example, in a half-slot, i.e., a slot divided into the first (earlier) seven symbols and the second (later) seven symbols, the RACH resources present in the half-slot to which the SS block is transmitted may be excluded from the available RACH resources.

As another example, the base station 100 may indicate, to the user equipment 200, information indicating the position of the RACH resource in the time domain by the RACH configuration table, regardless of the DL/UL assignment or the position of SS block in the time domain.

For example, the base station 100 may indicate, to the user equipment 200, information indicating that from among the available RACH resources, the RACH resource is allocated to the kth slot or the nth symbol. Available RACH resources may be defined by the use of the symbols described above as "Not Downlink", "Uplink", or symbols allocated at positions later in the time domain than the position of the SS block within the slot.

As another example, a different RACH configuration table may be defined for each subcarrier spacing of PRACH. Even in the same preamble format, the time length of the preamble differs depending on the subcarrier spacing of PRACH. Thus, it may be difficult to set the appropriate positions of the RACH resources in the time domain into a common RACH configuration table with an index specifying table, while taking into account of the allocation of the DL/UL assignment or SS block.

For example, when a sequence length of PRACH is a long sequence, i.e., 839, and subcarrier spacing of PRACH of 1.25 kHz or 5 kHz is applied, one RACH configuration table may be specified for long sequence.

When the sequence length of PRACH is a short sequence, i.e., 139, and subcarrier spacing of PRACH of 15 kHz or 30 kHz is applied at the frequency band of 6 GHz or less, and subcarrier spacing of PRACH of 60 kHz or 120 kHz is applied at the frequency band of 6 GHz or more, four different RACH configuration tables corresponding to respective subcarrier spacings of PRACH may be specified for short sequence.

For long sequence, the RACH configuration table may be specified based on the slot length of 1 ms. The RACH configuration table may also be defined on the basis of the corresponding slot length for each of 15 kHz, 30 kHz, 60 kHz, and 120 kHz, i.e., 1 ms, 0.5 ms, 0.25 ms, and 0.125 ms.

In the above-described embodiment, the user equipment 200 may use RACH resources other than RACH resources that are excluded based on DL/UL assignment or SS block allocation, among the RACH resources at the positions allocated in the time domain based on the index of the RACH configuration table indicated by the base station 100. Further, a different RACH configuration table may be specified for each subcarrier spacing of PRACH.

In the above-described embodiment, the user equipment 200 can identify whether or not the RACH resource is available when the RACH resource is allocated to an Unknown region among the DL/Unknown/UL assignment.

That is, at the initial access of the radio communication system, the available resources can be efficiently indicated to the user equipment.

(Device Configuration)

Next, a functional configuration example of the base station 100 and the user equipment 200 that execute the process and operation described above will be described. The base station 100 and the user equipment 200 each include at least functions for implementing the embodiments. Note that the base station 100 may have only a part of functions in the embodiments.

Figure 13:
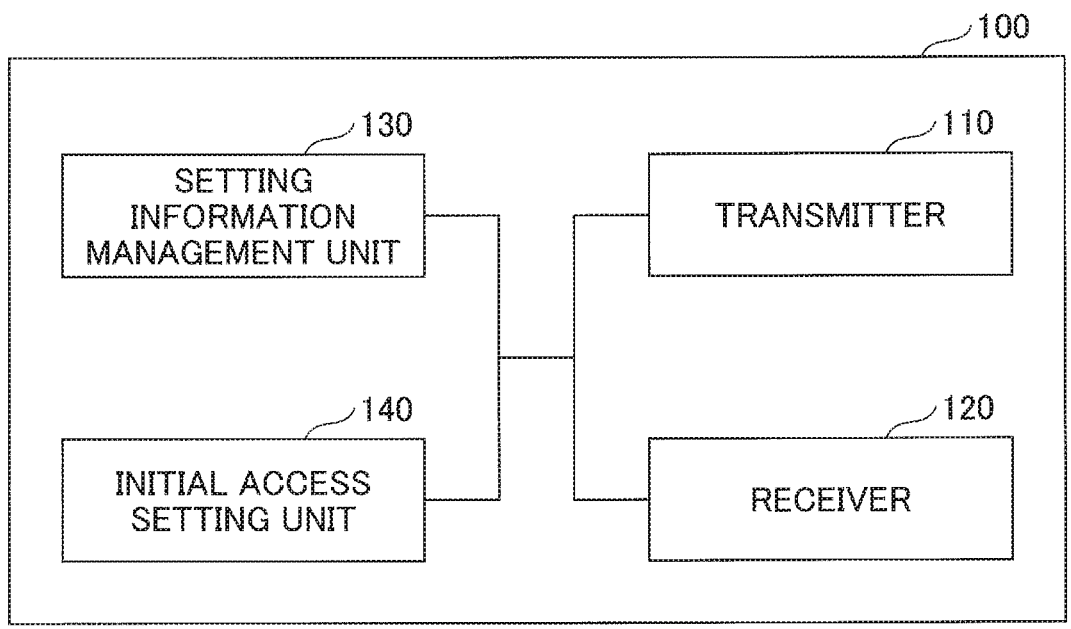
FIG. 13 is a diagram illustrating a functional configuration example of a base station 100 according to an embodiment of the present invention.

FIG. 13 is a diagram illustrating a functional configuration example of a base station 100. As illustrated in FIG. 13, the base station 100 includes a transmitter 110, a receiver 120, a setting information management unit 130, and an initial access setting unit 140. The functional configuration of the base station 100 illustrated in FIG. 13 is merely an example. Any terms for describing functional classification and functional components may be applied insofar as the operations according to the present embodiment may be executed.

The transmitter 110 includes a function of generating a signal to be transmitted to the user equipment 200 and transmitting a signal wirelessly. The receiver 120 includes a function for receiving various signals transmitted from the user equipment 200 and acquiring information of a higher layer, for example, from the received signal. The transmitter 110 has the function of transmitting NR-PSS, NR-SSS, NR-PBCH, DL/UL control signals, etc. to the user equipment 200. The transmitter 110 transmits information related to the transmit power control and information related to scheduling to the user equipment 200, and the receiver 120 receives a message related to a preamble and initial access from the user equipment 200.

The setting information management unit 130 stores preset setting information, and various setting information to be transmitted to the user equipment 200. The content of the setting information is, for example, information used for initial access.

The initial access setting unit 140 controls transmission of system information, including synchronization signals and information used for initial access to the user equipment 200, in the base station 100, as described in an embodiment, and controls initial access from the user equipment 200.

Figure 14:
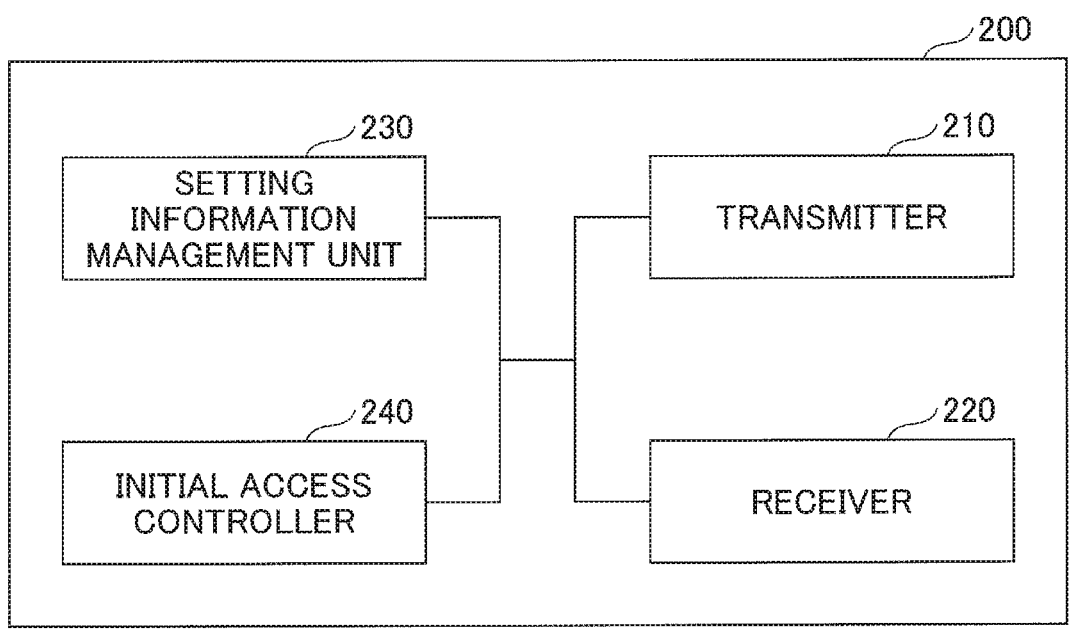
FIG. 14 is a diagram illustrating a functional configuration example of user equipment 200 according to an embodiment of the present invention.

FIG. 14 is a diagram illustrating a functional configuration example of the user equipment 200. As illustrated in FIG. 14, the user equipment 200 includes a transmitter 210, a receiver 220, a setting information management unit 230, and an initial access controller 240. The functional configuration illustrated in FIG. 14 is merely an example. Any terms for describing functional classification and functional components may be applied insofar as the operations according to the present embodiment may be executed.

The transmitter 210 generates a transmission signal from the transmit data and transmits the transmission signal wirelessly. The receiver 220 receives various signals wirelessly and acquires a higher layer signal from the received physical layer signal. The receiver 220 has a function to receive NR-PSS, NR-SS, NR-PBCH, DL/UL control signals, etc. transmitted from the base station 100. The transmitter 210 transmits a message pertaining to a preamble and initial access to the base station 100, and the receiver 120 receives information used for the initial access from the base station 100.

The setting information management unit 230 stores various setting information received from the base station 100 by the receiver 220. The setting information management unit 230 also stores the setting information preset in advance. The content of the setting information is, for example, information used for initial access.

The initial access controller 240 controls initial access in the user equipment 200 as described in the embodiment. The transmitter 210 may include a functional unit related to preamble signal transmission, etc. in the initial access controller 240, and the receiver 220 may include a functional unit related to the system information reception, etc. in the initial access controller 240.

Hardware Configuration

The functional configuration diagrams (FIGS. 13 and 14) used in the above description of the embodiments of the present invention illustrates functional block units. These functional blocks (components) are implemented by any combination of hardware and software. Here, means for implementing each functional block is not particularly limited. That is, the functional blocks may be implemented by one device physically and/or logically combining multiple elements or may be implemented by two or more physically and/or logically separated devices that are connected directly and/or indirectly (e.g., wired and/or wireless).

Figure 15:
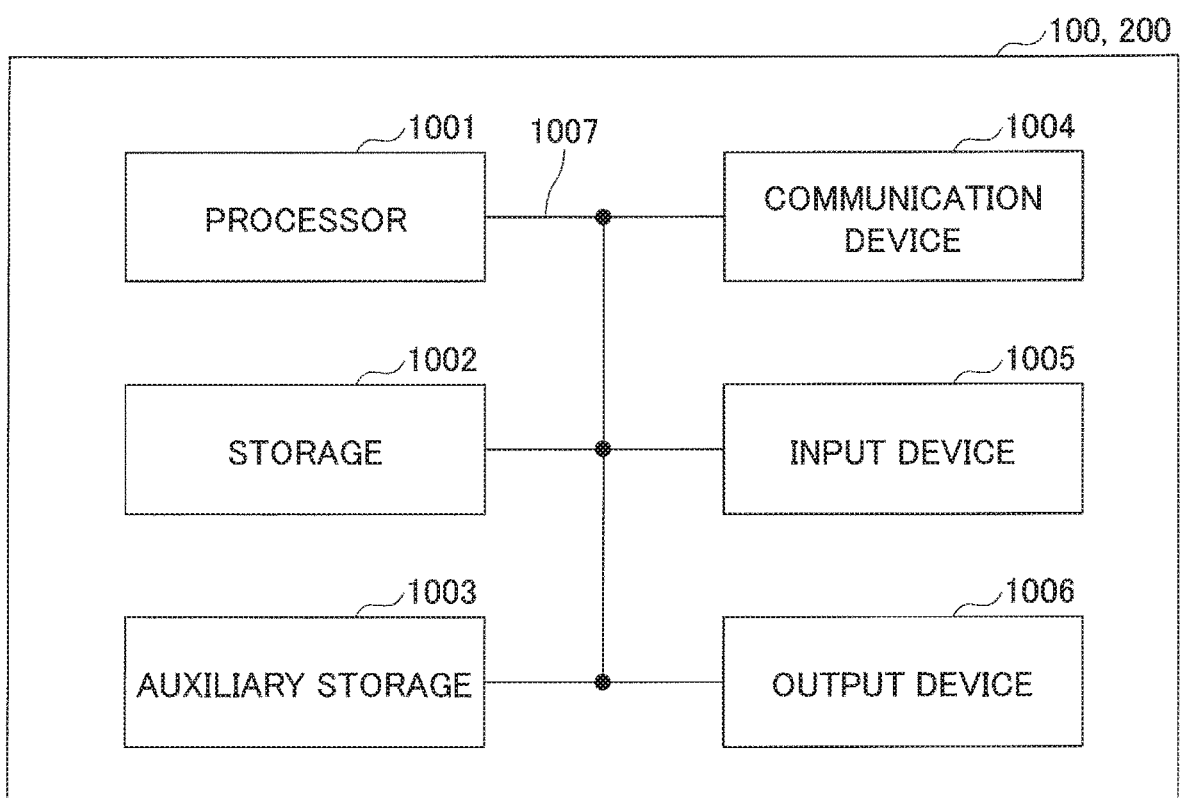
FIG. 15 is a diagram illustrating an example of a hardware configuration of a base station 100 or user equipment 200.

Further, the base station 100 and the user equipment 200 in one embodiment of the present invention may each function as a computer that performs processing according to the embodiments. FIG. 15 is a diagram illustrating a hardware configuration example of a base station 100 or the user equipment 200 according to the embodiments of the present invention. Each of the above-described base station 100 and user equipment 200 may be physically configured as a computer device including a processor 1001, a memory 1002, a storage 1003, a communication device 1004, an input device 1005, an output device 1006, a bus 1007, etc.

Note that, in the following description, the term "device" can be read as a circuit, an apparatus, a unit, etc. The hardware configuration of the base station 100 and the user equipment 200 may be configured to include one or more of the respective devices illustrated with reference to 1001 to 1006 in FIG. 15 or may be configured without including some of the devices.

The functions of the base station 100 and the user equipment 200 are implemented by allowing predetermined software (programs) to be loaded on the hardware such as the processor 1001, the storage 1002, and the like, so as to cause the processor 1001 to perform calculations to control communications by the communication device 1004, and reading and/or writing of data in the storage 1002 and the auxiliary storage 1003.

The processor 1001, for example, operates an operating system to control the entire computer. The processor 1001 may be configured to include a central processing unit (CPU) having an interface with peripherals, a control device, an operation device, and registers.

In addition, the processor 1001 loads programs (program codes), software modules or data from the auxiliary storage 1003 and/or the communication device 1004 into the storage 1002, and executes various processes according to the loaded programs, software modules or data. As the program, a program is used which causes a computer to execute at least a part of the operations described in the above-described embodiments. For example, the transmitter 110, the receiver 120, the setting information management unit 130, and the initial access setting unit 140 of the base station 100 illustrated in FIG. 13 may be implemented by a control program that is stored in the storage 1002 and that operates on the processor 1001. For example, the transmitter 210, the receiver 220, the setting information management unit 230, and the initial access controller 240 of the user equipment 200 illustrated in FIG. 14 may be implemented by a control program that is stored in the storage 1002 and that operates on the processor 1001. Although it is described that the above-described various processes are executed by a single processor 1001, the above-described various processes may be simultaneously or sequentially executed by two or more processors 1001. The processor 1001 may be implemented with one or more chips. Note that the program may be transmitted from a network via an electric communication line.

The storage 1002 may be a computer-readable recording medium composed of at least one of a ROM (Read Only Memory), an EPROM (Erasable Programmable ROM), an EEPROM (Electrically Erasable Programmable ROM), a RAM (Random Access Memory) and the like. The storage 1002 may be referred to as a register, a cache, a main memory (a main storage), or the like. The storage 1002 may store executable programs (program codes), software modules, and the like for implementing a process according to the embodiments of the present invention.

The auxiliary storage 1003 is a computer-readable recording medium composed, for example, of at least one of an optical disk such as a CD-ROM (Compact Disc ROM), a hard disk drive, a flexible disk, a magneto-optical disk (e.g., a compact disk, a digital versatile disk, and a Blu-ray (registered trademark) disk), a smart card, a flash memory (e.g., a card, a stick, and a key drive), a floppy (registered trademark) disk, and a magnetic strip. The auxiliary storage 1003 may be referred to as an auxiliary storage. The above-described storage medium may be, for example, a database, a server, or another appropriate medium including the storage 1002 and/or the auxiliary storage 1003.

The communication device 1004 is hardware (transmission/reception device) for performing communication between computers via a wired and/or wireless network, and, for example, the communication device 1004 is also referred to as a network device, a network controller, a network card, a communication module, etc. For example, the transmitter 110 and the receiver 120 of the base station 100 may be implemented by the communication device 1004. For example, the transmitter 210 and the receiver 220 of the user equipment 200 may be implemented by the communication device 1004.

The input device 1005 is an input device (e.g., a keyboard, a mouse, a microphone, a switch, a button, a sensor, etc.) for receiving an input from outside. The output device 1006 is configured to generate an output to the outside. Examples of the output device include a display, a speaker, and an LED lamp. Note that the input device 1005 and the output device 1006 may be integrated (for example, a touch panel).

In addition, the respective devices such as the processor 1001 and the storage 1002 may be connected via a bus 1007 for mutually communicating information with one another. The bus 1007 may be formed of a single bus, or the bus 1007 may be formed of buses that are different between devices.

Further, the base station 100 and the user equipment 200 each include hardware such as a microprocessor, a digital signal processor (DSP), an ASIC (Application Specific Integrated Circuit), a PLD (Programmable Logic Device), and an FPGA (Field Programmable Gate Array); a part of or all of the functional blocks of the base station 100 may be implemented by the hardware. For example, the processor 101 may be implemented with at least one of these hardware components.

Summary of Embodiments

According to the embodiments described above, a user equipment for communicating with a base station via a radio frame is disclosed. The user equipment includes a receiver configured to receive, from the base station, information indicating a downlink region or an uplink region in the radio frame, and information on a RACH configuration table, the RACH configuration table indicating allocation of RACH resources associated with a time domain in the radio frame;

a control unit configured to identify an available RACH resource, based on the information indicating a downlink region or an uplink region, and the information on the RACH configuration table; and a transmitter configured to transmit a preamble to the base station using the identified available RACH resource, wherein the information indicating the downlink region or the uplink region includes an unknown region that can be used for one of downlink and uplink, and wherein availability of the RACH resource included in the unknown region is explicitly or implicitly identified in a case where the information on the RACH configuration table indicates that the RACH resource is allocated to the unknown region.

In the above-described configuration, the user equipment 200 can identify whether or not the RACH resource is available when the RACH resource is allocated to an Unknown region among the DL/Unknown/UL assignment. Accordingly, in random access of a radio communication system, available resources can be efficiently indicated to the user equipment.

According to the above-described user equipment,
the receiver may receive, from the base station, information indicating whether the RACH resource included in the unknown region is available, and
the control unit may identify whether or not RACH resource included in the unknown region is available, based on the information indicating whether the RACH resource included in the unknown region is available. In this configuration, the user equipment can identify whether or not the RACH resource is available by being explicitly indicated, from the base station, of whether or not the RACH resource is available when the RACH resource is allocated in an unknown region among the DL/Unknown/UL assignment.

According to the above-described user equipment,
in a case where the information on the RACH configuration table indicating that the RACH resource is allocated to the unknown region, a region of the unknown region to which the RACH resource is allocated may be expected to be an uplink region. With this configuration, the user equipment can identify a part of an Unknown region that is an UL region without any other signaling in a case where the RACH resource is allocated to the Unknown region among the DL/Unknown/UL assignment.

According to the above-described user equipment,
when the information on the RACH configuration table indicates that a RACH resource is allocated to the unknown region, and the user equipment is in a connection state,
the RACH resource included in the unknown region is identified to be available, and
when the information on the RACH configuration table indicates that a RACH resource is allocated to the unknown region, and the user equipment is in an idle state,
the RACH resource included in the unknown region may be identified to be unavailable. With this configuration, the user equipment in an idle mode does not use RACH resources allocated to the "Unknown" because the information that can be acquired is limited, and the user equipment in a connected mode can use RACH resources allocated to the "Unknown" region based on the information that can be acquired.

According to the above-described user equipment,
when a region of the unknown region is indicated to be a downlink region or an uplink region in accordance with downlink control information received by the receiver while the information on the RACH configuration table indicates that a RACH resource is allocated to the unknown region, and the user equipment is in a connection state,
a RACH resource allocated to the downlink region of the unknown region may be identified to be unavailable, or
a RACH resource allocated to a region other than an uplink region of the unknown region may be identified to be unavailable. The user equipment in a connected mode can be configured not to use a RACH resource allocated to a DL region or outside an UL region, of the "Unknown" region.

According to the embodiments described above,
a base station for communicating with user equipment via a radio frame is disclosed. The base station includes
a transmitter configured to transmit, to the user equipment, information indicating a downlink region or an uplink region in the radio frame, and information on a RACH configuration table, the RACH configuration table indicating allocation of RACH resources associated with a time domain in the radio frame;
a setting unit configured to identify an available RACH resource, based on the information indicating a downlink region or an uplink region in the radio frame, and the information on the RACH configuration table; and
a receiver configured to receive a preamble from the user equipment using the identified available RACH resource, wherein
the information indicating the downlink region or the uplink region includes an unknown region that can be used for one of downlink and uplink, and wherein
availability of the RACH resource included in the unknown region is explicitly or implicitly identified in a case where the information on the RACH configuration table indicates that the RACH resource is allocated to the unknown region.

In the above-described configuration, the base station can cause the user equipment to identify whether or not the RACH resource is available when the RACH resource is allocated to an Unknown region among the DL/Unknown/UL assignment. Accordingly, in random access of a radio communication system, available resources can be efficiently indicated to the user equipment.

According to the embodiments described above,
a user equipment for communicating with a base station via a radio frame is disclosed. The user equipment includes
a receiver configured to receive, from the base station, information on a RACH configuration table indicating allocation associated with a time domain of the RACH resource in the radio frame, and information for excluding the RACH resource that is unavailable in the time domain of the radio frame;
a control unit configured to identify the available RACH resource, based on the information on the RACH configuration table, and the information excluding the unavailable RACH resource; and
a transmitter configured to transmit a preamble to the base station using the identified available RACH resource.

The above configuration allows the base station to identify RACH resources by indicating, to the user equipment, the RACH resource allocation using the RACH configuration table and the information that excludes unavailable RACH resources. Accordingly, in the initial access of the radio communication system, the available resources can be efficiently indicated to the user equipment.

The information to exclude RACH resources that are not available in the time domain of the radio frame may be information indicating a downlink assignment or an uplink assignment. This configuration allows the user equipment to identify available RACH resources based on the DL/UL assignment.

Information indicative of the downlink arrangement or uplink arrangement may be information indicative of the locations in the time domain of symbols used for downlink included in downlink slot and symbols not determined to be used for downlink or uplink, and symbols not used for uplink included in uplink slot and symbols not determined to be used for uplink or downlink. Such a configuration allows the user equipment to identify available RACH resources based on the type of symbol in the DL/UL assignment.

The control unit may exclude the RACH resources ahead in the time domain from the symbol including the last SS block in a certain slot, based on information for excluding the unavailable RACH resources in the time domain of the radio frame and the position in the time domain of the received SS block, or
may exclude RACH resources ahead of the symbol that includes an earlier one of two SS blocks in the time domain when two SS block transmission candidate positions exist in a certain slot and only the earlier SS block is received in the time domain, or may exclude all the RACH resources within a certain slot when two SS block transmission candidate positions exist in the slot and only the later one of the two SS blocks or the two SS blocks are received in the time domain, and thereby specify available RACH resources. With this configuration, the user equipment can identify available RACH resources based on the allocation of the SS blocks.

The RACH configuration table may be defined for each subcarrier spacing of the channel through which the preamble is transmitted. With such a configuration, the user equipment can use RACH resources with appropriate time domain or preamble time length depending on the subcarrier spacing by setting different RACH configuration tables for PRACH with different subcarrier spacing.

According to the embodiments described above, a base station for communicating with user equipment via a radio frame is disclosed. The base station includes a transmitter configured to transmit, to the user equipment, information on a RACH configuration table indicating allocation associated with a time domain of a RACH resource in the radio frame, and information for excluding the RACH resource that is unavailable in the time domain of the radio frame;

a setting unit configured to identify the available RACH resource, based on the information on the RACH configuration table, and the information excluding the unavailable RACH resource; and a receiver configured to receive a preamble from the user equipment using the identified available RACH resource.

The above configuration allows the base station to identify RACH resources by indicating, to the user equipment, the RACH resource allocation using the RACH configuration table and the information that excludes unavailable RACH resources. Accordingly, in the initial access of the radio communication system, the available resources can be efficiently indicated to the user equipment.

Supplementary Description of Embodiments

The embodiments have been described as described above; however, the disclosed invention is not limited to these embodiments, and a person skilled in the art would understand various variations, modifications, replacements, or the like. Specific examples of numerical values have been used for encouraging understanding of the present invention; however, these numeric values are merely examples and, unless otherwise noted, any appropriate values may be used. In the above description, partitioning of items is not essential to the present invention. Matters described in two or more items may be combined if necessary. Matters described in one item may be applied to matters described in another item (as long as they do not conflict). In a functional block diagram, boundaries of functional units or processing units do not necessarily correspond to physical boundaries of parts. Operations of multiple functional units may be physically performed in a single part, or operations of a single functional unit may be physically performed by multiple parts. The order of steps in the above described operating procedures according to an embodiment may be changed as long as there is no contradiction. For the sake of description convenience, the base station 100 and the user equipment 200 have been described by using functional block diagrams. These devices may be implemented by hardware, by software, or by combination of both. The software which is executed by a processor included in the base station 100 according to an embodiment and the software which is executed by a processor included in the user equipment 200 may be stored in a random access memory (RAM), a flash memory, a read-only memory (ROM), an EPROM, an EEPROM, a register, a hard disk drive (HDD), a removable disk, a CD-ROM, a database, a server, or any other appropriate recording medium.

Further, reporting of information is not limited to the aspects/embodiments described in this specification, and may be performed in other ways. For example, reporting of information may be performed by physical layer signaling (e.g., DCI (Downlink Control Information), UCI (Uplink Control Information)), upper layer signaling (e.g., RRC (Radio Resource Control) signaling, MAC (Medium Access Control) signaling, broadcast information (MIB (Master Information Block) and SIB (System Information Block)))), and other signals or a combination thereof. Further, RRC signaling may be referred to as an RRC message, and may be an RRC connection setup (RRCC connection setup) message, an RRC connection reconfiguration (RRCC connection registration) message, or the like.

Each aspect/embodiment described herein may be applied to LTE (Long Term Evolution), LTE-A (LTE-Advanced), SUPER 3G, IMT-Advanced, 4G, 5G, FRA (Future Radio Access), W-CDMA (registered trademark), GSM (registered trademark), CDMA 2000, UMB (Ultra Mobile Broadband), IEEE 802.11 (Wi-Fi), IEEE 802.16 (WiMAX), IEEE 802.20, UWB (Ultra-Wide Band), Bluetooth (registered trademark), and a system that utilize other suitable systems and/or a next generation system expanded based on such a system.

The order of processes, sequences, flowcharts, etc. of each aspect/embodiment described in the present specification may be exchanged as long as there is no inconsistency. For example, for the methods described in the specification, the elements of the various steps are presented in an exemplary order and are not limited to a specific order presented.

The specific operation that is performed by the base station 100 in this specification may be performed by its upper node in some cases. In a network composed of one or more network nodes having a base station 100, it is clear that the various operations performed for communication with the user equipment 200 may be performed by other network nodes than the base station 100 and/or the base station 100. Examples of such other network nodes include, but not limited to, MME or S-GW. In the above embodiments, a case where there is one network node other than the base station 100 is described; however, a plurality of other network nodes other than the base station 100 may be combined (e.g., MME and S-GW).

Aspects/embodiments described in this specification may be used alone or in combination, or may be switched in accordance with execution.

The user equipment 200 may also be referred to, by those skilled in the art, as a subscriber station, a mobile unit, a subscriber unit, a wireless unit, a remote unit, a mobile device, a wireless device, a wireless communication device, a remote device, a mobile subscriber station, a access terminal, a mobile computer, a wireless terminal, a remote terminal, a mobile subscriber station, a access terminal, a mobile computer, a wireless terminal, a remote terminal, a handset, a user agent, a mobile client, a client, or several other suitable terms.

The base station 100 may also be referred to, by those skilled in the art, as NB (Node B), eNB (enhanced Node B), Base Station, gNB, or several other suitable terms.

As used herein, the terms "determining" and "deciding" may encompass a wide variety of actions. The terms "determining" and "deciding" may be deemed to include, for example, judging, calculating, computing, processing, deriving, investigating, looking up (e.g., searching tables, databases or other data structures), and ascertaining. Further, the terms "determining" and "deciding" may be deemed to include, for example, receiving (e.g., receiving information), transmitting (e.g., transmitting information), input, output, and accessing (e.g., accessing data in memory). Moreover, the terms "determining" and "deciding", may be deemed to include, for example, resolving, selecting, choosing, establishing, and comparing (comparing). Namely, "determining" and "deciding" may include deeming that some operation is determined or decided.

The expression "on the basis of" used in the present specification does not mean "on the basis of only" unless otherwise stated particularly. In other words, the expression "on the basis of" means both "on the basis of only" and "on the basis of at least".

As long as "include", "including", and variations thereof are used in the specification or claims, these terms are intended to be inclusive in a manner similar to the term "comprising". Furthermore, the term "or" used in the specification or claims is intended to be not an exclusive "or".

In the entirety of the present disclosure, articles, such as "a", "an", or "the" in English that are added to a noun term by translation may indicate a plurality of the noun terms unless the articles obviously indicate a singular noun from the context.

In an embodiment of the present invention, SS block is an example of SS block. The initial access setting unit 140 is an example of a setting unit. RMSI is an example of the information required for initial access that is not included in the block. The initial access controller 240 is an example of a control unit. The RACH configuration table is an example of a RACH configuration table. DL/UL assignment or DL/Unknown/UL assignment is an example of information indicating the downlink region or the uplink region. "Downlink slot" in FIG. 8 or "Downlink region" in FIG. 9 is an example of a downlink slot. "Uplink region" in FIG. 9 is an example of a symbol used for uplink slots or uplink. The "Downlink" in FIG. 8 and the DL slot or DL symbol in FIG. 9 are examples of symbols used for downlink. In FIG. 8 or FIG. 9, "Unknown" is an example of a symbol used or not defined for downlink or uplink. "Not uplink" in FIG. 8 is an example of a symbol that is not used for uplink. Connected-mode is an example of a connection state. Idle-mode is an example of an idle state.

The present invention is described in detail above. It is apparent to a person ordinarily skilled in the art that the present invention is not limited to the embodiments described in the specification. The present invention can be implemented as modifications and alterations without departing from the gist and scope of the present invention that are determined by the descriptions of the claims. Accordingly, the description of the present specification is for the purpose of illustration and does not have any restrictive meaning to the present invention.

The present application is based on and claims the benefit of priority of Japanese Priority Application No. 2017-231720 filed on Dec. 1, 2017, the entire contents of which are hereby incorporated by reference.

DESCRIPTION OF REFERENCE SIGNS 100 base station
200 user equipment
110 transmitter
120 receiver
130 setting information management unit
140 initial access setting unit
200 user equipment
210 transmitter
220 receiver
230 setting information management unit
240 initial access controller
1001 processor
1002 storage
1003 auxiliary storage
1004 communication device
1005 input device
1006 output device

What is claimed is:

1. A terminal comprising:
a receiver configured to receive at least one synchronization signal block in a set including one or more synchronization signal blocks, and first information on a RACH configuration, the RACH configuration indicating allocation of RACH resources in a time domain;
a processor configured to identify an available RACH resource, based on symbols of the one or more synchronization signal blocks transmitted by a base station, and the first information; and
a transmitter configured to transmit a preamble to the base station using the available RACH resource,
wherein the receiver receives second information indicating a downlink region, an uplink region, or a region that is not specified whether the region is used for downlink or uplink,
the processor identifies the available RACH resource in symbols of the uplink region indicated by the second information, in the RACH resources indicated by the first information, and
wherein, in a case where there exists a region that is not specified by the second information whether used for downlink or uplink, the processor identifies the available RACH resource on a per symbol unit basis in a slot that includes the region that is not specified whether used for downlink or uplink.

2. The terminal according to claim 1,
wherein the processor identifies, as the available RACH resource, a RACH resource that exists later than a last symbol of the one or more synchronization signal blocks transmitted by the base station.

3. The terminal according to claim 2,
wherein the processor identifies, as the available RACH resource, a RACH resource that exists later than a last symbol of a synchronization signal block actually transmitted by the base station, in the set including the one or more synchronization signal blocks.

4. The terminal according to claim 1,
wherein the processor identifies, as the available RACH resource, a RACH resource that exists later than a last symbol of a synchronization signal block actually transmitted by the base station, in the set including the one or more synchronization signal blocks.

5. The terminal according to claim 1,
wherein the processor identifies the available RACH resource later than a last symbol indicated as the downlink region by the second information.

6. The terminal according to claim 1,
wherein, in a case where there exists a region that is not specified by the second information whether used for downlink or uplink, the transmitter does not transmit the random access preamble in a symbol in the region that is not specified whether used for downlink or uplink.

7. The terminal according to claim 1,
wherein, in a case where the second information is not received by the receiver, the processor identifies the available RACH resource based on a predefined range of unavailable RACH resources.

8. The terminal according to claim 1,
wherein the processor expects that a symbol in the available RACH resource can be used for uplink.

9. The terminal according to claim 1,
wherein the receiver expects that a data channel and a control channel are scheduled in a resource other than the resource identified as the available RACH resource, in the RACH resources indicated by the first information.

10. A communication method for a terminal, the communication method comprising:
receiving at least one synchronization signal block in a set including one or more synchronization signal blocks, and first information on a RACH configuration, the RACH configuration indicating allocation of RACH resources in a time domain;
identifying an available RACH resource, based on symbols of the one or more synchronization signal blocks transmitted by a base station, and the first information; and
transmitting a preamble to the base station using the available RACH resource,
wherein the communication method further comprises:
receiving second information indicating a downlink region, an uplink region, or a region that is not specified whether the region is used for downlink or uplink;
identifying the available RACH resource in symbols of the uplink region indicated by the second information, in the RACH resources indicated by the first information; and
in a case where there exists a region that is not specified by the second information whether used for downlink or uplink, identifying the available RACH resource on a per symbol unit basis in a slot that includes the region that is not specified whether used for downlink or uplink.

11. A base station comprising:
a transmitter configured to transmit at least one synchronization signal block in a set including one or more synchronization signal blocks, and first information on a RACH configuration, the RACH configuration indicating allocation of RACH resources in a time domain;
a processor configured to identify an available RACH resource, based on symbols of the one or more synchronization signal blocks transmitted by the base station, and the first information; and
a receiver configured to receive a preamble from a terminal using the identified available RACH resource,
wherein the transmitter transmits second information indicating a downlink region, an uplink region, or a region that is not specified whether the region is used for downlink or uplink,
the processor identifies the available RACH resource in symbols of the uplink region indicated by the second information, in the RACH resources indicated by the first information, and
wherein, in a case where there exists a region that is not specified by the second information whether used for downlink or uplink, the processor identifies the available RACH resource on a per symbol unit basis in a slot that includes the region that is not specified whether used for downlink or uplink.

* * * * *